US011510153B2

(12) United States Patent
Lee et al.

(10) Patent No.: US 11,510,153 B2
(45) Date of Patent: Nov. 22, 2022

(54) METHOD FOR CONTROLLING HEAT GENERATION IN ELECTRONIC DEVICE, ELECTRONIC DEVICE AND STORAGE MEDIUM FOR THE SAME

(71) Applicant: Samsung Electronics Co., Ltd., Suwon-si (KR)

(72) Inventors: Jaebeom Lee, Suwon-si (KR); Sungyong Bang, Suwon-si (KR); Sangyoung Son, Suwon-si (KR); Sangmin Lee, Suwon-si (KR); Jongwoo Kim, Suwon-si (KR); Hakryoul Kim, Suwon-si (KR); Mooyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/577,181

(22) Filed: Jan. 17, 2022

(65) Prior Publication Data

US 2022/0141777 A1    May 5, 2022

Related U.S. Application Data

(63) Continuation of application No. 16/841,309, filed on Apr. 6, 2020, now Pat. No. 11,228,986.

(30) Foreign Application Priority Data

May 15, 2019  (KR) .................. 10-2019-0057178

(51) Int. Cl.
*H04W 52/28* (2009.01)
*H04W 52/02* (2009.01)
*H04B 7/06* (2006.01)

(52) U.S. Cl.
CPC ........ *H04W 52/28* (2013.01); *H04M 2250/12* (2013.01)

(58) Field of Classification Search
CPC .................. H04W 52/28; H04M 2250/12
See application file for complete search history.

(56) References Cited

U.S. PATENT DOCUMENTS 10,625,567 B2 * 4/2020 Dudar ............... G01K 1/20
2010/0040167 A1   2/2010 Aoki et al.
(Continued)

FOREIGN PATENT DOCUMENTS

CN    108768434 A    11/2018
JP    2008-244603 A   10/2008
(Continued)

OTHER PUBLICATIONS

International Search Report dated Jul. 7, 2020 in connection with International Patent Application No. PCT/KR2020/004633, 3 pages.
(Continued)

*Primary Examiner* — Dominic E Rego

(57) ABSTRACT

An electronic device includes a plurality of antenna modules, a first communication circuit communicating in a first communication scheme via at least one antenna module The electronic device also includes a second communication circuit communicating in a second communication scheme. The electronic device further includes a temperature sensor, a processor and a memory storing instructions. The instructions are configured to, when executed, enable the at least one processor to detect a temperature associated with the antenna module or the first communication circuit while communicating via the first communication circuit, identify a first control step among a plurality of control steps based on an operation type of the electronic device and the at least one temperature detected, and limit at least some operations on at least one of the at least one antenna module or the first (Continued)

communication circuit, corresponding to the identified first control step.

19 Claims, 16 Drawing Sheets

(56) References Cited

U.S. PATENT DOCUMENTS

| | | | |
|---|---|---|---|
| 2010/0106223 A1* | 4/2010 | Grevious | A61N 1/37229 |
| | | | 343/866 |
| 2010/0111203 A1 | 5/2010 | Aoki et al. | |
| 2012/0057645 A1 | 3/2012 | Tesanovic et al. | |
| 2012/0270606 A1 | 10/2012 | Kim et al. | |
| 2012/0311357 A1 | 12/2012 | Andrews | |
| 2013/0142090 A1 | 6/2013 | Seo et al. | |
| 2014/0199952 A1* | 7/2014 | Sandhu | H04B 17/13 |
| | | | 455/91 |
| 2015/0038082 A1 | 2/2015 | Sekine et al. | |
| 2015/0231402 A1 | 8/2015 | Aghassian | |
| 2015/0349836 A1* | 12/2015 | Ponukumati | H04B 1/401 |
| | | | 455/553.1 |
| 2015/0350401 A1 | 12/2015 | Nishioka et al. | |
| 2016/0062423 A1 | 3/2016 | Kim et al. | |
| 2016/0164549 A1 | 6/2016 | Kim et al. | |
| 2016/0197691 A1 | 7/2016 | Su et al. | |
| 2016/0197749 A1 | 7/2016 | Hasegawa | |
| 2016/0249162 A1 | 8/2016 | Mayuzumi et al. | |
| 2016/0249262 A1 | 8/2016 | Hirao | |
| 2016/0373235 A1 | 12/2016 | Oh et al. | |
| 2017/0163293 A1 | 6/2017 | Lee et al. | |
| 2017/0208544 A1 | 7/2017 | Hunt-Schroeder et al. | |
| 2018/0358993 A1 | 12/2018 | Kang et al. | |
| 2019/0028073 A1 | 1/2019 | Ghim et al. | |
| 2019/0222245 A1 | 7/2019 | Lim et al. | |
| 2019/0229764 A1 | 7/2019 | Kang et al. | |
| 2019/0379427 A1 | 12/2019 | Geekie et al. | |
| 2020/0192442 A1* | 6/2020 | Islam | H04W 52/0209 |

FOREIGN PATENT DOCUMENTS

| | | |
|---|---|---|
| KR | 10-2005-0082941 A | 8/2005 |
| KR | 10-2012-0119328 A | 10/2012 |
| WO | 2012-151161 A1 | 11/2012 |
| WO | 2019045865 A1 | 3/2019 |

OTHER PUBLICATIONS

Written Opinion of the International Searching Authority dated Jul. 7, 2020 in connection with International Patent Application No. PCT/KR2020/004633, 3 pages.

European Patent Office, "Supplementary European Search Report" dated Apr. 5, 2022, in connection with European Patent Application No. 20805704.2, 14 pages.

* cited by examiner

| TYPE | Name(s) |
|---|---|
| HEAT GENERATION ZONE | TZ0, TZ1, TZ2, .... |
| POWER | 'getDisplay Status','getBrightnessleval','getCurrentAvg' |
| INTERNET | 'getTotalRxBytes','getTotalTxBytes','getMobileRxBytes', 'getMobileTxBytes' |
| APPLICATION | 'mediaPlaying','appCallActive','cameraActive' |
| SYSTEM USAGE | 'memoryUsage','systemCPU%' |
| BATTERY | Battery information |
| ADC | 'adc_mif','adc_big','adc_little','adc_int','adc_vid', 'adc_gpu','adc_memory','adc_8_path' |
| OTHER HEAT-GENERATING ELEMENTS | TEMPERATURE OF, E.G., WIFI, AP, PA, OR CHARGER |
| ACTUAL MAXIMUM TEMPERATURE | 'Max', (RECORDED USING THERMAL IMAGING CAMERA) |

FIG.12

METHOD FOR CONTROLLING HEAT GENERATION IN ELECTRONIC DEVICE, ELECTRONIC DEVICE AND STORAGE MEDIUM FOR THE SAME

CROSS-REFERENCE TO RELATED APPLICATION

This application is a continuation of U.S. patent application Ser. No. 16/841,309 filed on Apr. 6, 2020, which is based on and claims priority under 35 U.S.C. 119 to Korean Patent Application No. 10-2019-0057178 filed on May 15, 2019, in the Korean Intellectual Property Office, the disclosures of which are herein incorporated by reference in their entirety.

BACKGROUND

1. Field

Various embodiments of the disclosure relate to a method for controlling the heat generation in an electronic device, an electronic device, and storage medium for the same.

2. Description of Related Art

In order to meet the demand for wireless data traffic soring since the 4G communication system came to the market, there are ongoing efforts to develop 5G communication systems. Implementation considered to achieve a higher data transmission rate, 5G communication systems, allow for use of a new band, e.g., ultra-high frequency band (e.g., a 60 GHz band), as well as the prior communication bands used for 3G or LTE.

Electronic devices supporting mmWave, which is an ultra-high frequency band, may pack a plurality of antenna modules. Due to their high frequency characteristics mmWave radio channels have high straightness and large path loss and, to make up for these issues, highly directional beamforming is essential and, to that end, a plurality of antenna modules are needed. For example, an electronic device may be equipped with a plurality of antenna modules that radiate signals in different directions.

The above information is presented as background information only to assist with an understanding of the disclosure. No determination has been made, and no assertion is made, as to whether any of the above might be applicable as prior art with regard to the disclosure.

SUMMARY 5G communication technology allows for transmission of more data and consumes more power, thus is subject to a potential issue of causing the electronic device to heat up. For example, the electronic device consumes more power due to an increase in data throughput and use of a high frequency band which ends up causing more heat and hence overheating of the antenna module in use or the surroundings of the antenna module. The overheating of the antenna module or surroundings may cause the user of the electronic device to feel uncomfortable and even a low-temperature burn. Furthermore, the components (e.g., battery) around the overheated antenna module may be damaged, and the overall performance of the electronic device may be deteriorated.

Thus, a need exists for a method for efficiently controlling heat generation in the electronic device for smooth communication of the electronic device.

In accordance with various embodiments, an electronic device comprises a plurality of antenna modules, a first communication circuit communicating in a first communication scheme via at least one the antenna module among the plurality of antenna modules, a second communication circuit communicating in a second communication scheme, at least one temperature sensor, at least one processor operatively connected with the first communication circuit, the second communication circuit, and the at least one temperature sensor, and a memory storing instructions configured to, when executed, enable the at least one processor to detect a temperature associated with at least one of the at least one antenna module or the first communication circuit while communicating via the first communication circuit, identifying a first control step among a plurality of control steps based on an operation type of the electronic device and the at least one temperature detected, and limit at least some operations on at least one of the at least one antenna module or the first communication circuit, corresponding to the identified first control step.

In accordance with various embodiments, a method for controlling heat generation in an electronic device comprises, upon communication in a first communication scheme using a first communication circuit via at least one antenna module among a plurality of antenna modules, detecting a temperature associated with at least one of the at least one antenna module or the first communication circuit from at least one temperature sensor, identifying a first control step among a plurality of control steps based on an operation type of the electronic device and the at least one temperature detected, and limiting at least some operations on at least one of the at least one antenna module or the first communication circuit, corresponding to the identified first control step.

In accordance with various embodiments, there is provided a storage medium storing instructions, the instructions configured to, when executed by at least one processor, enable the at least one processor to perform at least one operation, the at least one operation comprising, upon communication in a first communication scheme using a first communication circuit via at least one antenna module among a plurality of antenna modules, detecting a temperature associated with at least one of the at least one antenna module or the first communication circuit from at least one temperature sensor, identifying a first control step among a plurality of control steps based on an operation type of the electronic device and the at least one temperature detected, and limiting at least some operations on at least one of the at least one antenna module or the first communication circuit, corresponding to the identified first control step.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Definitions for certain words and phrases are provided throughout this patent document, those of ordinary skill in the art should understand that in many, if not most instances, such definitions apply to prior, as well as future uses of such defined words and phrases:

FIG. 12 illustrates a table of example data used for predicting the surface heat generation temperature according to an embodiment;

Throughout the drawings, like reference numerals will be understood to refer to like parts, components, and structures.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms as used herein are provided merely to describe some embodiments thereof, but not to limit the scope of other embodiments of the disclosure. It is to be understood that the singular forms "a", "an" and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Figure 1:
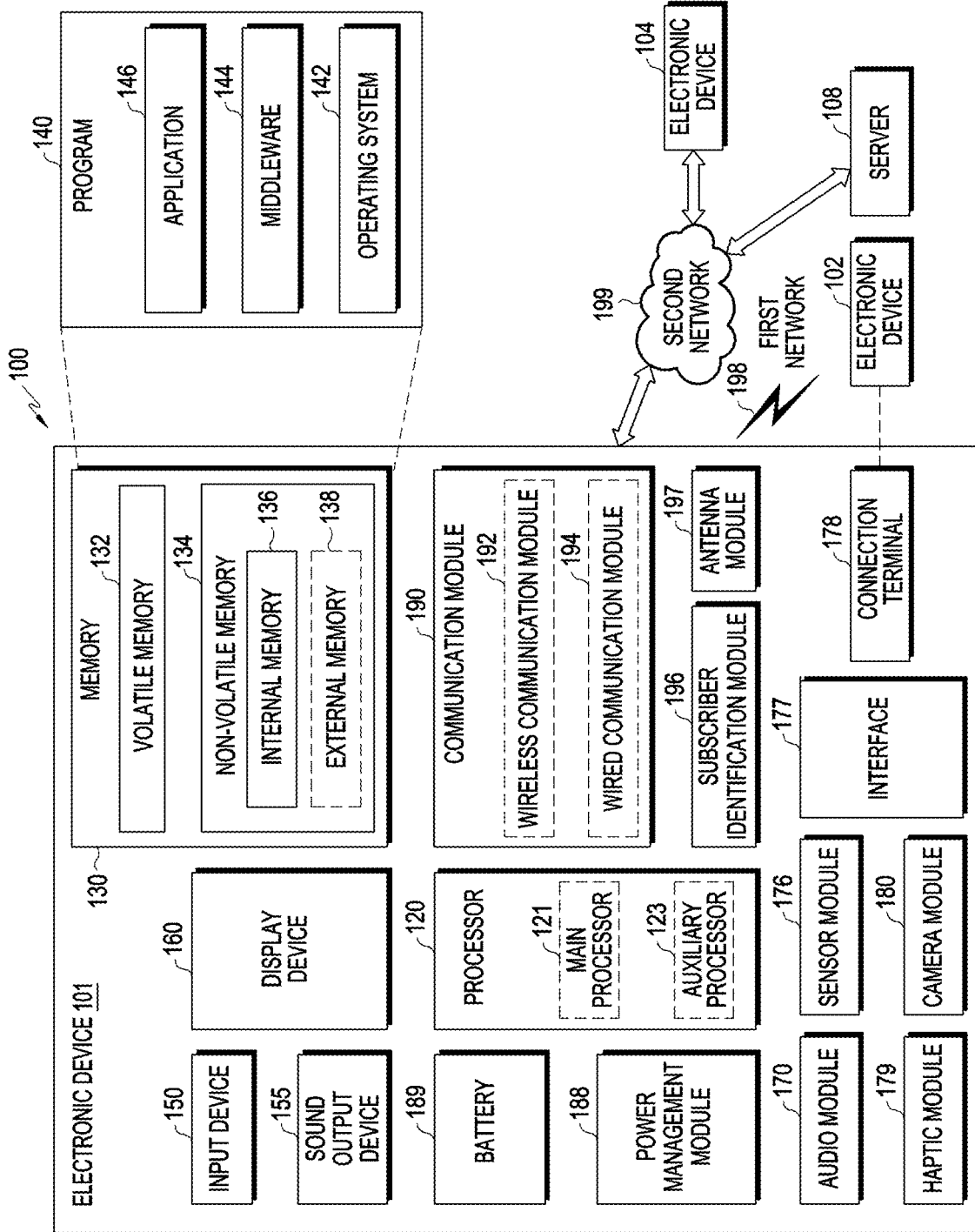
FIG. 1 illustrates a block diagram of an electronic device in a network environment according to an embodiment.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120 and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
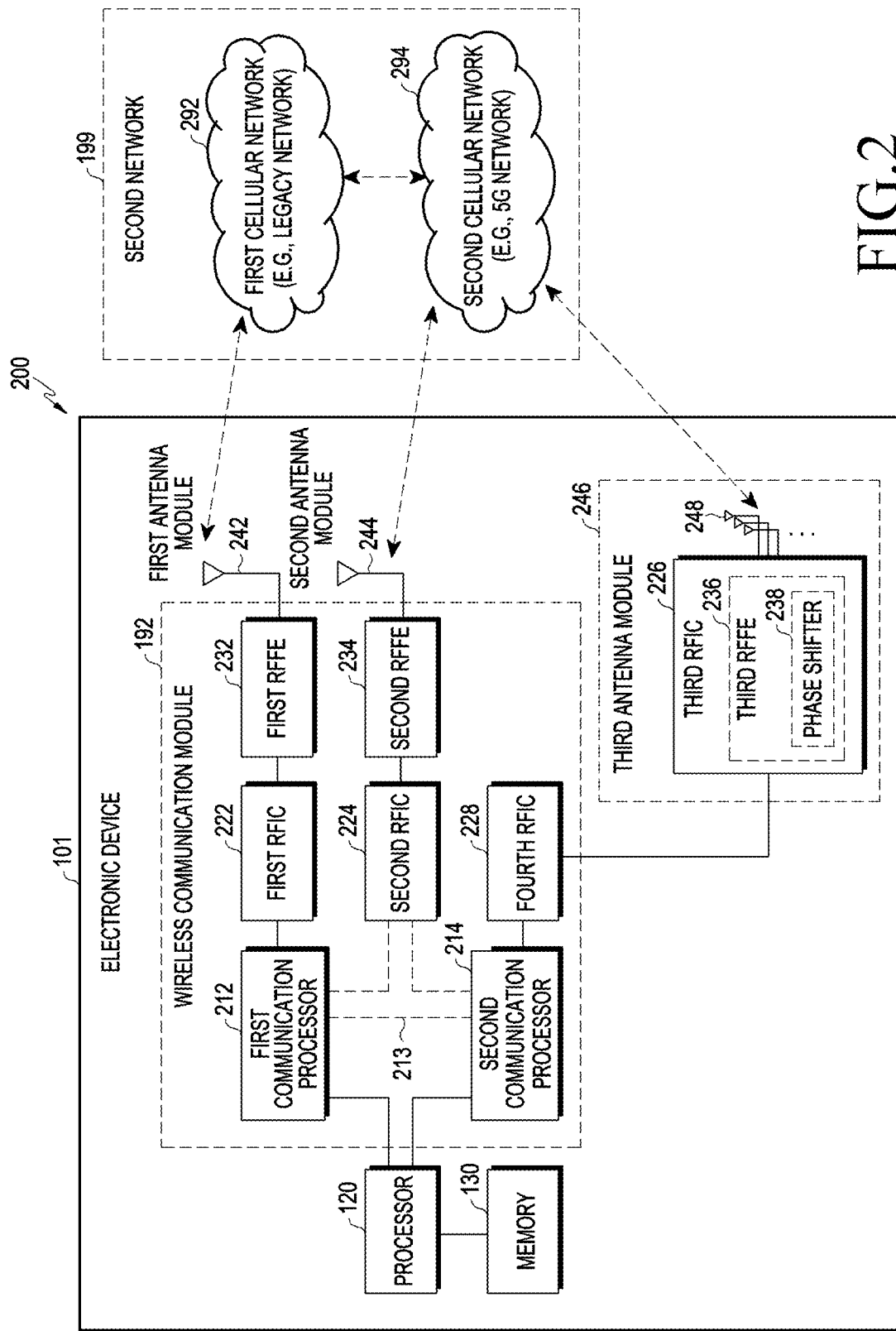
FIG. 2 illustrates a view of an electronic device in a network environment including a plurality of cellular networks according to an embodiment.

FIG. 2 illustrates a block diagram 200 of an electronic device 101 in a network environment including a plurality of cellular networks according to an embodiment.

Referring to FIG. 2, the electronic device 101 may include a first communication processor (CP) 212, a second CP 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor (CP) 212, the second CP 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first CP 212 may establish a communication channel of a band that is to be used for wireless communication with the first cellular network 292 or may support legacy network communication via the established communication channel. According to an embodiment, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel. According to an embodiment, the first CP 212 and the second CP 214 may be implemented in a single chip or a single package. According to an embodiment, the first CP 212 or the second CP 214, along with the processor 120, an assistance processor 123, or communication module 190, may be formed in a single chip or single package.

Upon transmission, the first RFIC 222 may convert a baseband signal generated by the first CP 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first CP 212.

Upon transmission, the second RFIC 224 may convert the baseband signal generated by the first CP 212 or the second CP 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first CP 212 and the second CP 214.

The third RFIC 226 may convert the baseband signal generated by the second CP 214 into a 5G Above6 band (e.g., from about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second CP 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second CP 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second CP 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first CP 212, or the second CP 214).

Surface heat of the electronic device which occurs during data transmission/reception on 5G communication needs to be limited to a predetermined range or less. A method of controlling heat generation is described below in detail. A method for reducing surface heat generation temperature is to use the temperature of the processor (e.g., application processor (AP)) of the electronic device to control the operation of the processor or application.

If temperature control is performed based on the AP temperature, the surface heat generation temperature may be reduced by controlling the CPU or GPU clock, screen brightness, and power charged, which are system resources. However, the surface heat generation temperature due to heat generation in the 5G antenna module and communication circuit, which are major components for actual 5G communication, are impossible to completely control during 5G communication and, if 5G communication goes on in a high surface heat generation temperature, the temperature rise may accelerate. Stepwise restrictions on the operation of a 5G antenna module and communication circuit, which are typically blamed for overheat in 5G communication, may allow for continuous use of 5G communication and decrease the surface temperature that the user feels.

The foregoing is described below in detail with reference to FIG. 3.

Figure 3:
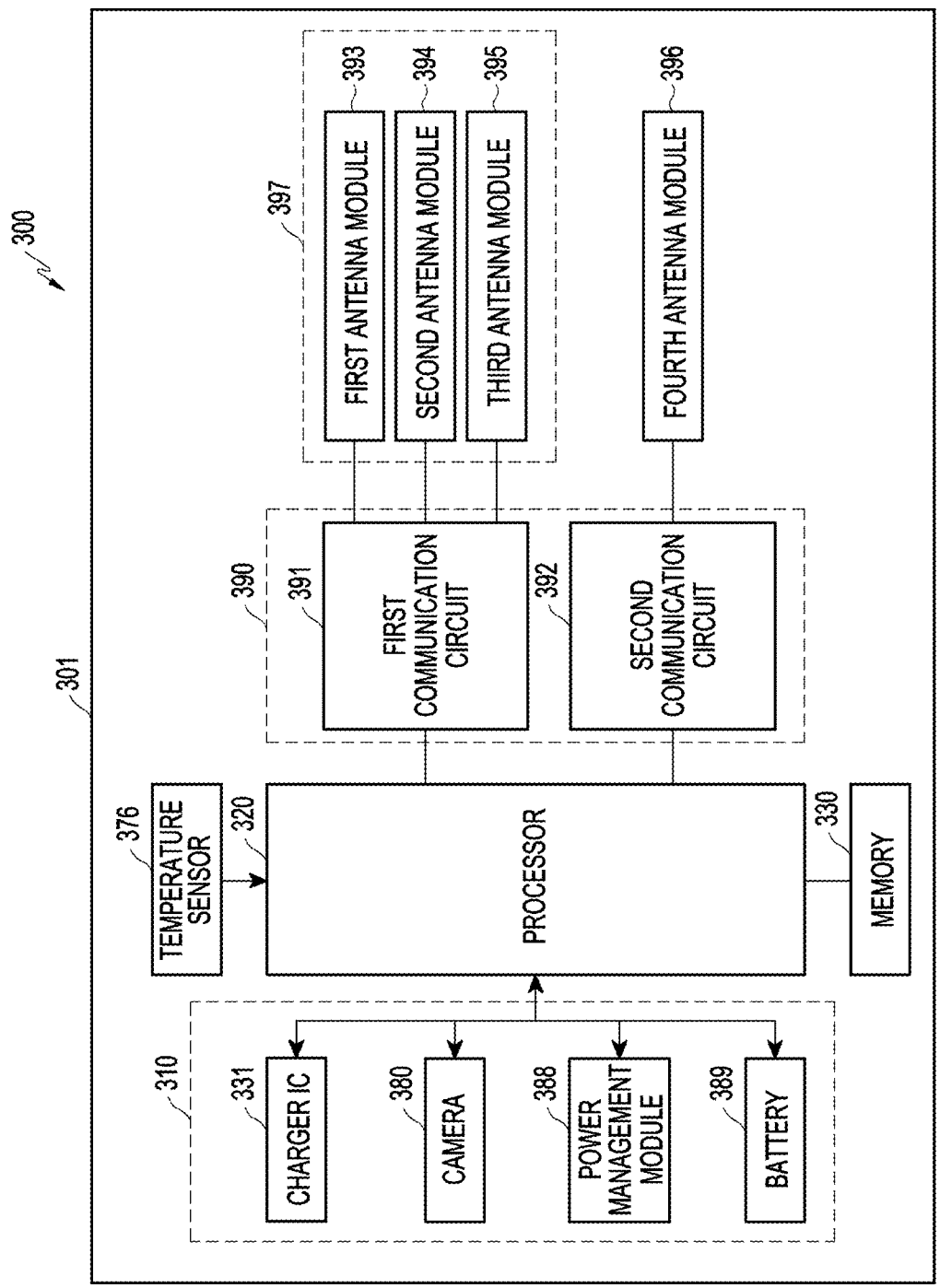
FIG. 3 illustrates a block diagram of an internal configuration of an electronic device performing heat generation control according to an embodiment.

FIG. 3 illustrates a block diagram 300 of an internal configuration of an electronic device performing heat generation control according to an embodiment.

An electronic device 301 may include the whole or part of, e.g., the electronic device 101 of FIG. 1 or 2. The electronic device 301 may include one or more processors 320 (e.g., application processor (AP)), a memory 330, a charger IC 331, a temperature sensor 376, a camera 380, a power management module 388, a battery 389, a communication circuit 390, and an antenna module 397. According to an embodiment, the electronic device 301 may exclude at least one of the components or may add another component. The term "module" used in connection with FIG. 3 denotes a unit processing at least one function or operation and be implemented in hardware, software, or a combination thereof. Although the term "module" is used in connection with the electronic device 301, the term may be interchangeably used with "circuit," "circuitry," "unit," or "device."

According to an embodiment, the communication circuit 390 may include a first communication circuit 391 and a second communication circuit 392. According to an embodiment, the first communication circuit 391 may communicate via the antenna module 397 in a first communication scheme, and the second communication circuit 392 may communicate in a second communication scheme. According to an embodiment, the first communication scheme may be a 5G communication protocol-based communication scheme, and the second communication scheme may be a long-term evolution (LTE) communication protocol-based communication scheme.

According to an embodiment, the configuration of the communication circuit 390 may include a communication processor (CP), and the CP and the communication circuit 390 may be implemented to operate in a single block. The CP may control, e.g., the communication circuit 390, to receive data transferred over the network and may transfer data received from the processor 120 (e.g., an AP) to the network. According to an embodiment, the CP may support LTE communication and/or 5G communication of the electronic device 301. For example, the CP may be configured to include a first CP supporting legacy network communication and a second CP supporting 5G network communication.

According to an embodiment, the antenna module 397 may be connected to the first communication circuit 391. According to an embodiment, the antenna module 397 may include a plurality of antenna modules 393, 394, and 395. A fourth antenna module 396 may be connected to the second communication circuit 392. For example, each antenna module 393, 394, and 395 connected to the first communication circuit 391 may be configured of an antenna array including a plurality of antenna elements that may be used for beamforming. For example, the fourth antenna module 396 connected to the second communication circuit 392 may be for LTE communication.

According to an embodiment, the first communication circuit 391 may perform 5G communication using at least one of the first antenna module to third antenna module 393, 394, and 395 included in the antenna module 397. For example, the antenna module 397 may be for 5G beamforming.

According to an embodiment, temperature sensors may be disposed to measure the temperature of the first antenna module to third antenna module 393, 394, and 395. A temperature sensor may be disposed adjacent to, or inside, each antenna module 393, 394, and 395.

According to an embodiment, the temperature sensor 376 may be at least one thermistor circuit disposed inside the electronic device 301 and may output a temperature value by the resistance that varies depending on the temperature. According to an embodiment, a thermistor may be connected to each antenna module 393, 394, and 395. The processor 320 may measure the temperature using the thermistor connected to each antenna module 393, 394, and 395.

According to an embodiment, the processor 320 may measure the temperature of each antenna module 393, 394, and 395 according to predetermined periods or continuously during 5G communication using the temperature sensor 376, thereby monitoring whether heat generation occurs. The temperature sensor 376 may be connected to the processor 320 or the communication circuit 390, and the measured temperature may be transferred to the processor 320 or communication circuit 390. For example, the temperature sensor 376 may be connected to the AP or CP, and the measured temperature may be transferred to the AP or CP for comparison with a predetermined threshold temperature. At least one antenna module, corresponding to the heat generation state, among the first antenna module to third antenna module 393, 394, and 395, may be identified based on the result of comparison.

According to an embodiment, the temperature sensor 376 may include at least one temperature sensor. To measure the temperature during 5G communication, the at least one temperature sensor may include a first temperature sensor disposed in at least one of the inside and outside of the antenna module 397 and a second temperature sensor disposed in at least one of the inside and outside of the first communication circuit 391.

According to an embodiment, the processor 320 may measure temperature using the temperature sensor 376. According to an embodiment, it may be the processor 320, e.g., the AP or CP, that measures temperature. For example, even not in 5G communication, each component, such as the processor 320, charger IC 331, camera 380, power management module 388, or battery 389, and its adjacent temperature sensor 376 may be operated under the control of the AP or CP. Thus, corresponding to the instruction from the AP or CP, the temperature sensor 376 may passively transfer the state corresponding to the temperature value and, corresponding to this, the AP or CP may obtain the temperature from the temperature sensor 376. In addition, the temperature sensor 376 may be disposed adjacent to various components, such as a sub PCB (not shown), a Wi-Fi module (not shown), or a 4G PAM (not shown). Although FIG. 3 illustrates that the electronic device 301 includes one temperature sensor 376, the electronic device 301 is not limited thereto but may include a plurality of temperature sensors, and an arrangement of the plurality of temperature sensors is described below.

According to an embodiment, the processor 320, e.g., AP or CP, may measure temperature periodically or according to a designated condition, using the temperature sensor 376 and, for monitoring the temperature of the components, the processor 320 may periodically measure and identify the state corresponding to the temperature value by the temperature sensor 376. For example, the processor 320 may periodically measure the temperature of the antenna module 397 and first communication circuit 391, which are components for 5G communication, using the temperature sensor 376, and the period of measurement may be adjusted. At this time, although the temperature of at least one of the antenna module 397 and the first communication circuit 391 rises, the surface of the electronic device 301 may not immediately reflect the rising temperature. Thus, the temperature may be measured per predetermined period.

According to an embodiment, the processor 320 may control at least one other component (e.g., a hardware or software component) of the electronic device 301 and process or compute various types of data.

According to an embodiment, the processor 320 may identify whether the surface of the electronic device 301 overheats during 5G communication and may perform operations for heat generation control.

According to an embodiment, the processor 320 may monitor a plurality of temperature sensor values using the temperature sensor 376 while 5G communication is performed. According to an embodiment, the processor 320 may obtain the temperature related to heat generated from the antenna module 397 and the temperature related to heat generated from the first communication circuit 391. According to an embodiment, although measuring temperature according to the predetermined period using the temperature sensor 376, the processor 320 may control to periodically measure the temperature of each of the antenna module 397 and first communication circuit 391, which are related to 5G communication, while connection for 5G communication is being attempted or while 5G communication is in connection. As such, the processor 320 may monitor the temperature of the antenna module 397 and first communication circuit 391, which are components related to 5G communication, only while 5G communication is in connection, thus reducing system loads.

According to an embodiment, the processor 320 may use the obtained temperature in calculating the surface heat generation temperature of the electronic device 301 while performing 5G communication. The processor 320 may determine which one among the 5G communication-related components may be blamed for the heat generation state, based on the calculated surface heat generation temperature. According to an embodiment, the processor 320 may identify the heat generation position of the electronic device 301 based on the surface heat generation temperature. For example, the temperature detected by the temperature sensor disposed at each of the antenna module 397 and first communication circuit 391, although the amount of heat transferred to the surface may vary depending on the mounting or heat-dissipation structure of the antenna module 397 and first communication circuit 391, may be proportional to the surface heat generation state and, thus, the position of the component related to the heat generation may be identified.

According to an embodiment, the processor 320 may calculate the surface heat generation temperature of the electronic device 301 based on the obtained temperature. For example, the processor 320 may predict the surface heat generation temperature using a linear regression analysis scheme which is described below.

According to an embodiment, the processor 320 may identify the operation type of the electronic device 301 while 5G communication is performed. According to an embodiment, the operation type of the electronic device 301 may include at least one of the type of at least one application in execution, the system usage rate, power consumption, or whether the electronic device is gripped or charged. The operation type of the electronic device 301 may further include whether the 5G network is in connection and the amount of data transmitted.

According to an embodiment, the processor 320 may set the threshold temperature for identifying a corresponding control step among the plurality of control steps to differ depending on at least one heat generation-related element included in the operation type of the electronic device.

For example, when the surface heat generation temperature is higher than a first threshold temperature which is the lowest, heat generation control may begin.

As set forth above, each per-control step threshold temperature or each per-control step temperature range may be set considering at least one heat generation-related element included in the operation type of the electronic device.

According to an embodiment, the processor 320 may determine a control level for lowering the surface heat generation temperature based on the predicted surface heat generation temperature and the operation type. According to an embodiment, if 5G connection is there and the calculated surface heat generation temperature is attributed to the use of 5G, the processor 320 may set stepwise control each of the antenna module 397 and first communication circuit 391 to control heat-generation per source. According to an embodiment, the processor 320 may independently set a control level for each of the antenna module 397 and first communication circuit 391. For example, if the temperature of the second antenna module 394 arises, and the temperature of the first antenna module 393 and the third antenna module 395 does not reach the threshold temperature for heat generation control, heat generation control may be performed only on the second antenna module 394.

As such, according to an embodiment, each of all of the components related to heat generation control, e.g., the first antenna module 393 to the third antenna module 395, or the first communication circuit 391, may be set with a different control level. Further, the threshold temperature for determining the control level may dynamically vary depending on the operation type.

According to an embodiment, the memory 330 may store the control step corresponding to the surface heat generation temperature and a control policy for the antenna module 397 and first communication circuit 391 depending on the control step. For example, the processor 320 may determine when and how much the operation of the antenna module 397 and first communication circuit 391 is to be restricted, using a different control policy for each of the control steps. Here, a control signal (or instruction) indicating what control operation is to be performed may be determined using a learning algorithm technique (or learning model) based on an artificial intelligence algorithm.

The learning model may be a model trained using an algorithm technique of self-classifying/learning the features of the surface heat generation temperature of the electronic device, as does machine learning.

According to an embodiment, the memory 330 may store a model trained using a linear regression analysis scheme for predicting the surface heat generation temperature. For example, the learning model may be trained using heat-generating elements during 5G communication, e.g., the surface heat generation temperature predicted considering the operation type of the electronic device and the temperature from at least one temperature sensor, and the actual surface heat generation temperature of the electronic device 301. Here, the actual surface heat generation temperature of the electronic device 301 may be one measured using a thermal imaging camera. Such a learning model may be trained so that the predicted surface heat generation temperature is as close to the actual surface heat generation temperature as possible. As such, the process of updating the predicted surface heat generation temperature based on the temperature and the operation type of the electronic device may be repeated, thereby allowing it to be trained so that the predicted surface heat generation temperature approaches the actual surface heat generation temperature.

As set forth above, an input-output relationship may be yielded via machine learning, so that weights for the input parameters may be obtained. If the weights are obtained, the output varying dependent on variations in the input parameter may be calculated even in various use environments and, based thereupon, surface heat generation temperature may be predicted in various operation contexts, e.g., game playing, browsing, or video calls. In addition, in connection with 5G communication, connection or not of 5G network and data transmission rate, as well as the temperature of the antenna module 397 and first communication circuit 391, may be set as input parameters and be used upon predicting the surface heat generation temperature.

According to an embodiment, an electronic device 301 comprises a plurality of antenna modules (397, 396), a first communication circuit 391 communicating in a first communication scheme via at least one antenna module 397 among the plurality of antenna modules, a second communication circuit 392 communicating in a second communication scheme, at least one temperature sensor 376, at least one processor 320 operatively connected with the first communication circuit 391, the second communication circuit 392, and the at least one temperature sensor 376, and a memory 330 storing instructions configured to, when executed, enable the at least one processor 320 to detect a temperature associated with at least one of the at least one antenna module 397 or the first communication circuit 391 while communicating via the first communication circuit 391, identifying a first control step among a plurality of control steps based on an operation type of the electronic device and the at least one temperature detected, and limit at least some operations on at least one of the at least one antenna module 397 or the first communication circuit 391, corresponding to the identified first control step.

According to an embodiment, the first communication scheme may be a 5G communication protocol-based communication scheme, and the second communication scheme may be a long-term evolution (LTE) communication protocol-based communication scheme.

According to an embodiment, the instructions may be configured to enable the at least one processor 320 to identify the surface heat generation temperature of the electronic device 301 based on the at least one temperature detected and identify a second control step among the plurality of control steps based on the operation type of the electronic device 301 and the surface heat generation temperature. According to an embodiment, the operation type of the electronic device 301 may include at least one of the type of at least one application in execution, the system usage rate, power consumption, or whether the electronic device 301 is gripped or charged.

According to an embodiment, the instructions may be configured to enable the at least one processor 320 to identify a heat generation position of the electronic device 301 based on the determined surface heat generation temperature and limit at least some operations on at least one of the at least one antenna module 397 or the first communication circuit 391 corresponding to the identified position.

According to an embodiment, the instructions may be configured to enable the at least one processor 320 to, when the identified surface heat generation temperature a third control step of a threshold temperature or more, limit both the at least one antenna module 397 and the first communication circuit 391 and perform communication via the second communication circuit 392.

According to an embodiment, the instructions may be configured to enable the at least one processor 320 to adjust power of the at least one antenna module 397, corresponding to the identified first control step, and limit a data throughput rate via the first communication circuit 391.

According to an embodiment, the instructions may be configured to enable the at least one processor 320 to turn off at least part of the at least one antenna module 397, corresponding to the identified first control step, and limit a data throughput rate via the first communication circuit 391.

According to an embodiment, the instructions may be configured to enable the at least one processor 320 to set the threshold temperature for identifying a corresponding control step among the plurality of control steps to differ depending on at least one heat generation-related element included in the operation type of the electronic device.

According to an embodiment, the at least one temperature sensor 376 may include a first temperature sensor disposed in at least one of an inside and outside of the at least one antenna module 397 and a second temperature sensor disposed in at least one of an inside and outside of the first communication circuit 391.

Figures 4A, 4B:
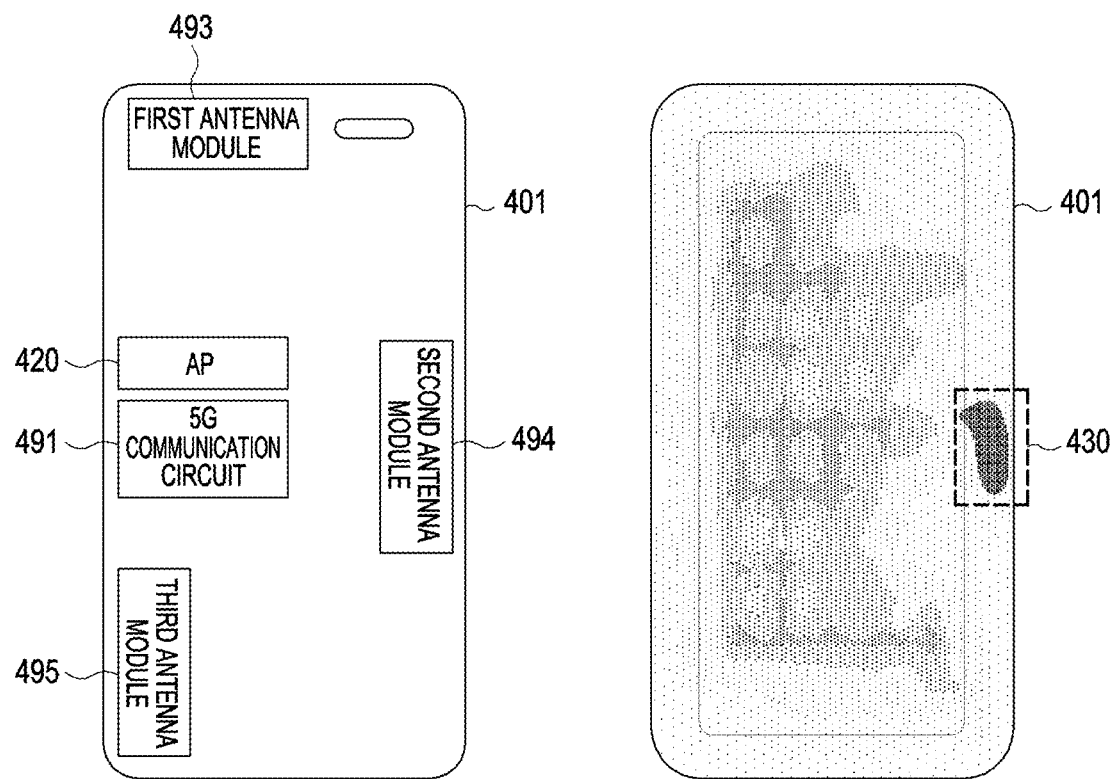
FIGS. 4A and 4B illustrate a view of a temperature distribution of an electronic device when an antenna module in the electronic device heats up, according to an embodiment.

FIGS. 4A and 4B illustrate a view of a temperature distribution of an electronic device when an antenna module in the electronic device heats up, according to an embodiment.

FIG. 4A illustrates an example module configuration mounted inside the housing of the electronic device 401, and FIG. 4B illustrates a temperature distribution according to heat generation in the antenna module of the module configuration of the electronic device.

As shown in FIG. 4A, the electronic device 401 may include an AP 420 (e.g., the processor 320 of FIG. 3), a 5G communication circuit 491 (e.g., the first communication circuit 391 of FIG. 3), a first antenna module 494, a second antenna module 494, or a third antenna module 495, in the housing of the electronic device 401. Other components than those described above may be included in the housing of the electronic device 401. FIG. 4A illustrates example components corresponding to heat-generating sources related to 5G communication.

Since a microwave antenna module is required to process more data using a high frequency band, it consumes lots of power and generates more heat. If the antenna module which is being operated for communication with the base station heats up, an overheat area 430 may be formed with respect to the position of the components, which are heat-generating sources, in the electronic device 401 as shown in FIG. 4B. For example, FIG. 4B illustrates an example in which the overheat area 430 is formed with respect to the position of the second antenna module 494. Here, use of a thermal imaging camera on the electronic device which is in operation for 5G communication allows for acquisition of a thermal distribution image related to the temperature on the surface of the electronic device.

If the overheat area 430 is formed in the electronic device 401 as shown in FIG. 4B, the user of the electronic device 401 may feel uncomfortable, and the overheat area 430 and its surrounding components (e.g., battery) may be damaged. Resultantly, the overall performance of the electronic device 401 may be affected.

According to an embodiment, for each 5G communication-related component, e.g., the 5G communication circuit 491, the first antenna module 493, the second antenna module 494, or the third antenna module 495, a different reference for determining the degree of heat generation may be set per antenna module. Although the temperature information measured by the temperature sensor disposed corresponding to each antenna module inside the electronic device 401 may be proportional to the surface heat generation state of each antenna module, the amount of heat transferred to the outside of the antenna module may be varied depending on the packing structure or heat-radiating structure of each antenna module.

Further, the threshold temperature at each level for determining the control level may be adjusted per operation type of the electronic device. According to an embodiment, the threshold temperature at each level may be set to differ per operation type of the electronic device, as shown in Table 1.

TABLE 1

|  | first operation type | second operation type | ... | Nth operation type |
|---|---|---|---|---|
| level 0 | 41° C. | 38° C. | ... | A° C. |
| level 1 | 42° C. | 39° C. | ... | B° C. |
| level 2 | 43° C. | 40° C. | ... | C° C. |
| level 3 | 44° C. | 41° C. | ... | D° C. |

The threshold temperature for determining the control level may vary depending on the operation type of the electronic device, including the type of application in execution. For example, if the first operation type indicates the execution of a game application, the threshold temperature of level 0 may be 41° C., and the threshold temperature may be set to rise as the level goes up. In contrast, if the second operation type indicates running a video call on a phone application, the surface heat generation temperature may be lower than when a game is played. Thus, the threshold temperature of level 0 may be set to be lower than the threshold temperature of the first operation type and, thus, the per-level threshold temperature may be higher than the per-level threshold temperature of the first operation type. If the Nth type is a mixed operation type in which two or more applications simultaneously run, the threshold temperature of level 0 may be set to be higher than when one application runs. As described above, heat generation control may be performed stepwise. Thus, if the surface heat generation temperature descends, the control level may gradually go down as well, and the operations which have been limited corresponding to the control level may be released gradually, thereby enabling smooth 5G communication.

For example, upon video call, the video call screen, front camera, and AP may simultaneously run. In the music streaming environment while the battery is being charged, the charging terminals, AP, speaker (or earphone) or such components may simultaneously be used. Further, different amounts of data may need to be transmitted depending on various operation circumstances, such as video streaming or word processing on a cloud. As such, in various operation circumstances, different surface heat generation temperature references are managed, and different amounts of data are needed. Thus, the threshold temperature which is a reference for determining the control level may dynamically vary depending on scenarios (or operation types of electronic device).

Figure 5:
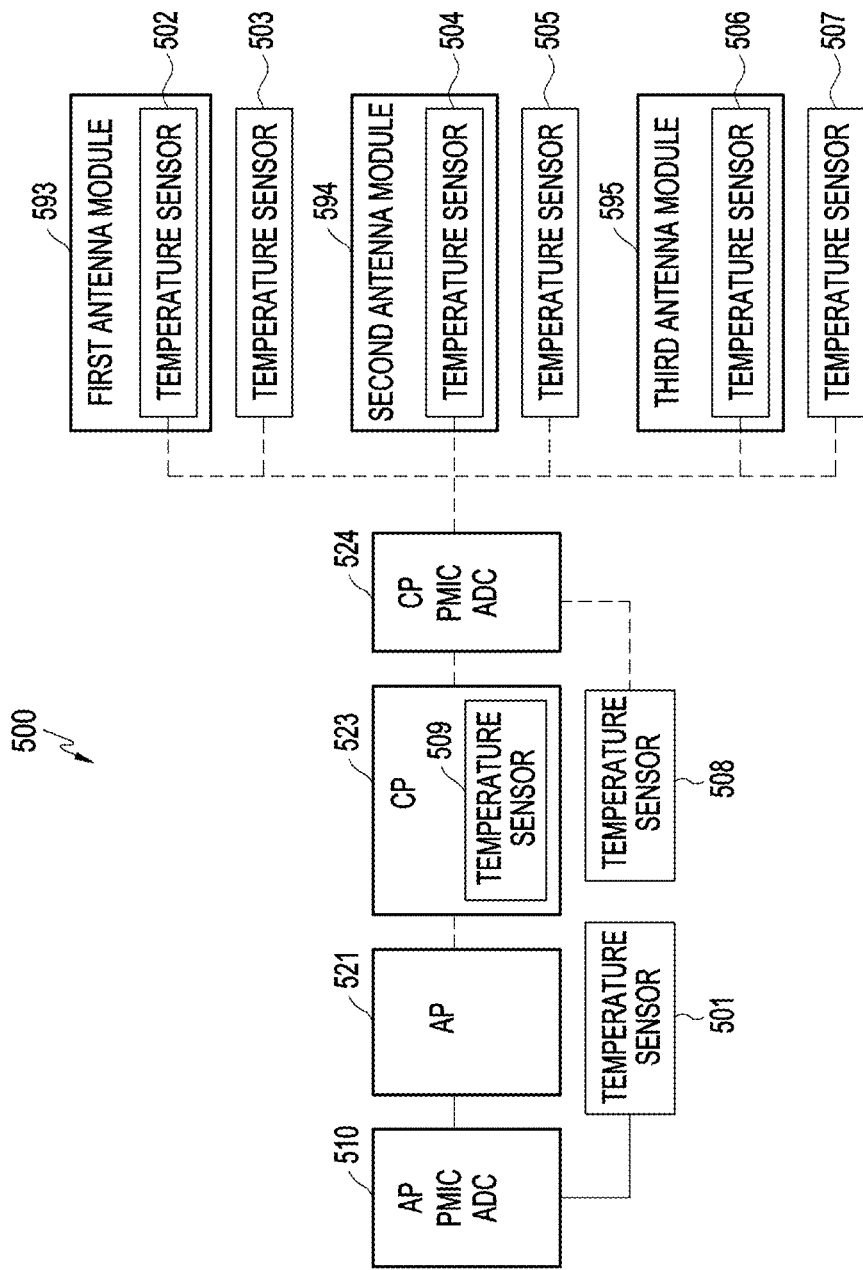
FIG. 5 illustrates a view of a method of measuring temperatures for 5G communication-related components in an electronic device according to an embodiment.

FIG. 5 illustrates a view 500 of a method of measuring temperatures for 5G communication-related components in an electronic device according to an embodiment.

FIG. 5 illustrates a configuration relationship for major modules mounted inside the electronic device. In FIG. 5, the connection relationship associated with the temperature measured by the temperature sensor may be shown in dashed lines.

According to an embodiment, the temperature sensors 502 and 503 corresponding to the first antenna module 593 may be disposed adjacent to, or inside, the first antenna module 593. The temperature sensors 504 and 505 corresponding to the second antenna module 594 may be disposed adjacent to, or inside, the second antenna module 594. The temperature sensors 506 and 507 corresponding to the third antenna module 595 may be disposed adjacent to, or inside, the third antenna module 595.

In contrast, the AP 521 may measure the temperature of heat generation-related components, such as a charger, battery, or Wi-Fi module, via the temperature sensor 501, through the AP power management integrated circuit (PMIC) application delivery controller (ADC) 510.

The temperature sensors 502, 503, 504, 505, 506, and 507 corresponding to the first antenna module 593 to the third antenna module 595 may be connected to the CP 523 or AP 521 via the CP PMIC ADC 524. Although FIG. 5 illustrates a path along which the temperature values measured via the PMIC ADC 524 of the CP and the PMIC ADC 510 of the AP are transferred to the CP 523 or the AP 521, this is merely an example, and the CP PMIC ADC 524 connected to the CP 523 and the AP PMIC ADC 510 connected to the AP 521 may be omitted. Thus, the AP or CP may read the temperature value via the AP PMIC ADC 510 or CP PMIC ADC 524, respectively, or the AP or CP may directly read the temperature value without relying on the CP PMIC ADC 524 and AP PMIC ADC 510. The CP PMIC ADC 524 may be connected to the CP 523, communicating signals with at least one of the first antenna module 593 to the third antenna module 595.

According to an embodiment, the temperatures measured by the temperature sensors 502, 503, 504, 505, 506, and 507 corresponding to the first antenna module 593 to the third antenna module 595 may be transferred to the CP 523 or the AP 521, so that the AP 521 itself may determine the degree of heat generation for each module, or the CP 523 may determine the degree of heat generation for each module. To measure the temperature of the CP 523, temperature sensors 508 and 509 may be disposed inside or outside the CP 523.

As set forth above, the temperatures from the temperature sensors 502, 503, 504, 505, 506, and 507 inside or outside the first antenna module 593 to the third antenna module 595 may be transferred to the CP 523 via the CP PMIC ADC 524. In this case, the temperature measured by the temperature sensor 509 inside the CP 523 may be read by the CP 523 directly without relying on the CP PMIC ADC 524. If the measured temperature is transferred to the CP 523, the CP 523 may determine the degree of heat generation for each module based on the temperature of each 5G communication-related module, e.g., the first antenna module 593 to the third antenna module 595 or the CP 523. If the CP 523 is not used and is thus in sleep mode, the CP 523 may be woken up at the request of the AP 521, and the temperature may be transferred. The CP 523 may correspond to the first communication circuit 391 of FIG. 3, and the temperature sensors 508 and 509 inside or outside the CP 523 may correspond to the temperature sensor 376 that measures the temperature of the first communication circuit 391 of FIG. 3. Likewise, the first antenna module 593 to the third antenna module 595 may correspond to the antenna modules inside the antenna module 397 of FIG. 3.

For example, in the case of 5G communication, the AP 521 may read in the temperature via the CP 523 as shown in FIG. 5 and, upon LTE fallback, the CP 523 may wake up and identify the temperature. Alternatively, the temperature of the CP 523 may be directly read by the AP 521. As set forth above, the scheme of reading in the temperature of the CP 523 may be varied depending on the chipset.

Figure 6:
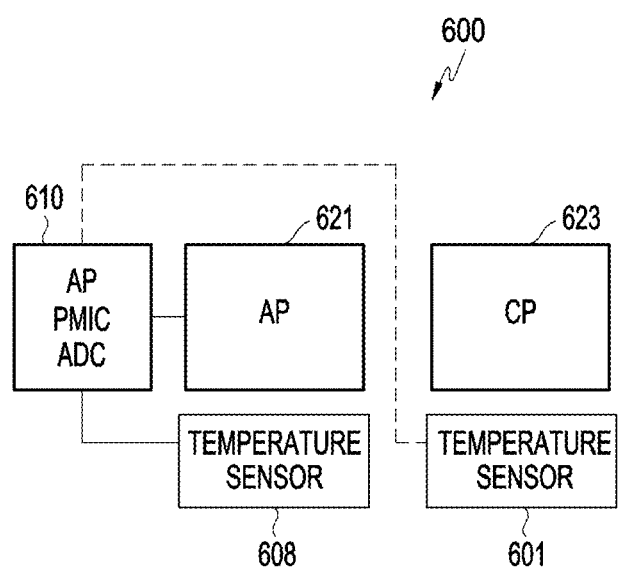
FIG. 6 illustrates a view of another method of measuring temperatures for 5G communication-related components in an electronic device according to an embodiment.

FIG. 6 illustrates a view 600 of another method of measuring temperatures for 5G communication-related components in an electronic device according to an embodiment.

In FIG. 6, the connection relationship associated with the temperature measured by the temperature sensor may be shown in dashed lines. FIG. 6 illustrates an example scheme in which the temperature of the CP 623 may be directly read by the AP 621. As described above in connection with FIG. 5, the AP 621 may measure the temperature of heat generation-related components, such as a charger, battery, or Wi-Fi module, via the AP PMIC ADC 610. Although FIG. 6 illustrates an example path along which the AP 621 reads the temperature measurements via the AP's PMIC ADC 610, this is merely an example, and the AP PMIC ADC 610 may be omitted.

As shown in FIG. 6, the AP 621 may directly read the temperature of the CP 623 from the temperature sensor 601 placed outside the CP 623 regardless of whether the CP 623 is in sleep mode. Thus, despite LTE fallback, the CP 623 needs to be woken, and heat generation control, upon 5G communication, may be rendered possible based on the temperature directly read by the AP 621.

Figure 7:
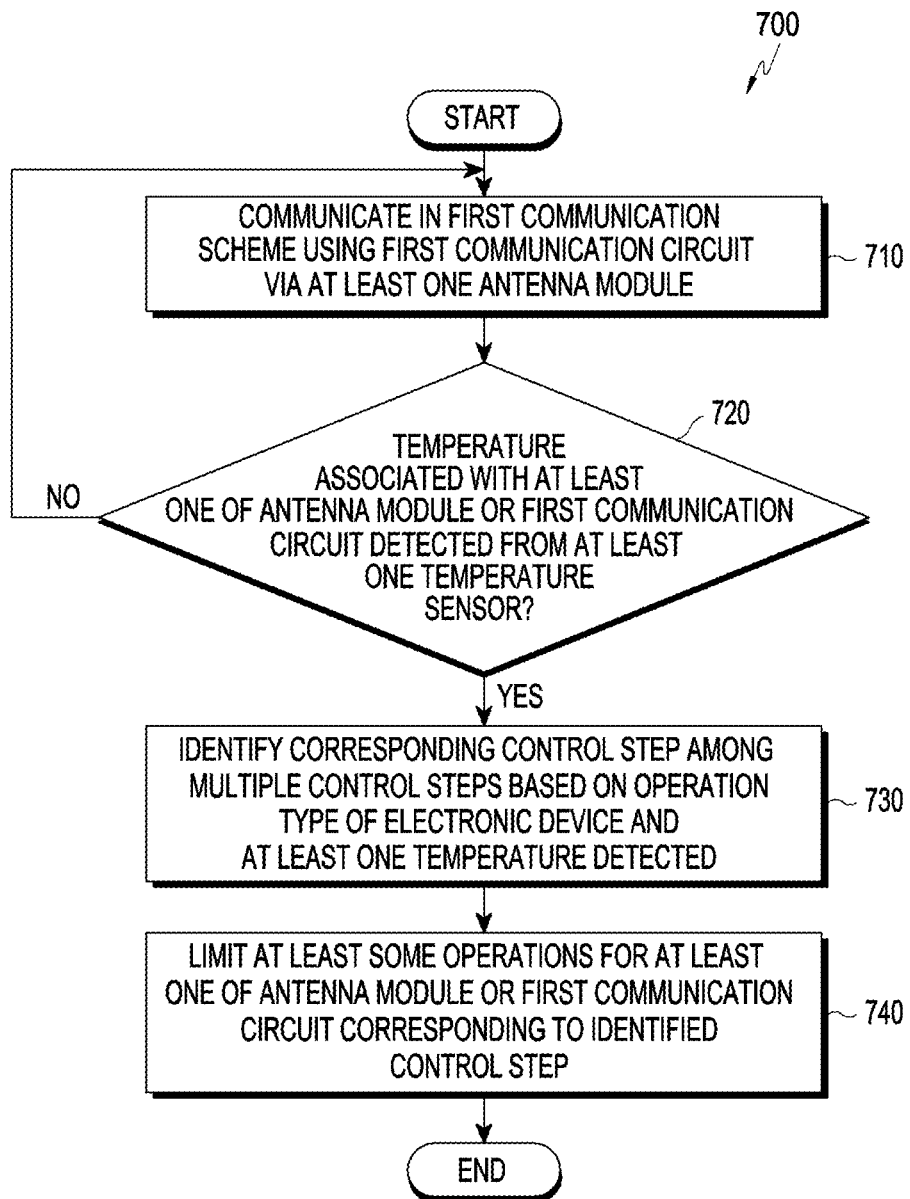
FIG. 7 illustrates a flowchart of operations for heat generation control on an electronic device according to an embodiment.

FIG. 7 illustrates a flowchart 700 of operations for heat generation control on an electronic device according to an embodiment.

Referring to FIG. 7, the operation method may include operations 710 to 740. Each step/operation of the operation method may be performed by at least one of an electronic device (e.g., the electronic device 101 or 301 of FIG. 1, 2, or 3) or at least one processor (e.g., the processor 120 or 320 of FIG. 1, 2, or 3) of the electronic device. According to an embodiment, at least one of operations 710 to 740 may be omitted or changed in order or may add other operations.

In operation 710, an electronic device may communicate in a first communication scheme using a first communication circuit (e.g., the first communication circuit 391 of FIG. 3) via at least one antenna module (e.g., the antenna module 397 of FIG. 3). According to an embodiment, the first communication scheme may be a 5G communication protocol-based communication scheme.

In operation 720, upon communication in the first communication scheme, the electronic device may determine whether a temperature associated with at least one of the at least one antenna module or the first communication circuit is detected from at least one temperature sensor (e.g., the temperature sensor 376 of FIG. 3). In this case, the electronic device may perform temperature detection on 5G heat generation-related components according to a predetermined period or condition. For example, the electronic device may periodically measure temperature in 10-second units, and the measurement period may vary.

If a temperature related to heat generation upon 5G communication is detected, the electronic device may identify a corresponding control step among a plurality of control steps based on the operation type of the electronic device and the at least one detected temperature in operation 730.

According to an embodiment, identifying the corresponding control step among the plurality of control steps may include determining the surface heat generation temperature of the electronic device based on the at least one temperature detected, identifying the operation type of the electronic device, and identifying the corresponding control step among the plurality of control steps based on the identified operation type of the electronic device and the determined surface heat generation temperature. According to an embodiment, identifying the corresponding control step among the plurality of control steps may include determining a surface heat generation temperature of the electronic device based on the operation type of the electronic device and the at least one temperature detected and identifying a control step corresponding to the determined surface heat generation temperature among the plurality of control steps. As such, the operation type of the electronic device, along with the detected temperature, may be used to determine the surface heat generation temperature. Or, the operation type of the electronic device may be used to identify the control step after the surface heat generation temperature is yielded based on the detected temperature.

According to an embodiment, the operation type of the electronic device may include at least one of the type of at least one application in execution, the system usage rate, power consumption, or whether the electronic device is gripped or charged.

In operation 740, the electronic device may limit at least some operations for at least one of the at least one antenna module or the first communication circuit, corresponding to the identified control step. According to an embodiment, limiting the at least one some operations on the at least one of the at least one antenna module or the first communication circuit may include identifying a heat generation position of the electronic device based on the determined surface heat generation temperature and limiting at least some operations on at least one of the at least one antenna module or the first communication circuit corresponding to the identified position.

According to an embodiment, limiting the at least some operations on the at least one of the antenna module or the first communication circuit may include, when the determined surface heat generation temperature corresponds to a control step of a threshold temperature or more, limiting all of operations of the at least one antenna module and operations of the first communication circuit and performing communication in a second communication scheme via a second communication circuit.

According to an embodiment, limiting the at least some operations on the at least one of the at least one antenna module or the first communication circuit may include adjusting power of the at least one antenna module, corresponding to the identified control step, and limiting a data throughput rate via the first communication circuit.

According to an embodiment, limiting the at least some operations on the at least one of the at least one antenna module or the first communication circuit may include turning off at least part of the at least one antenna module, corresponding to the identified control step, and limiting a data throughput rate via the first communication circuit.

Figure 8:
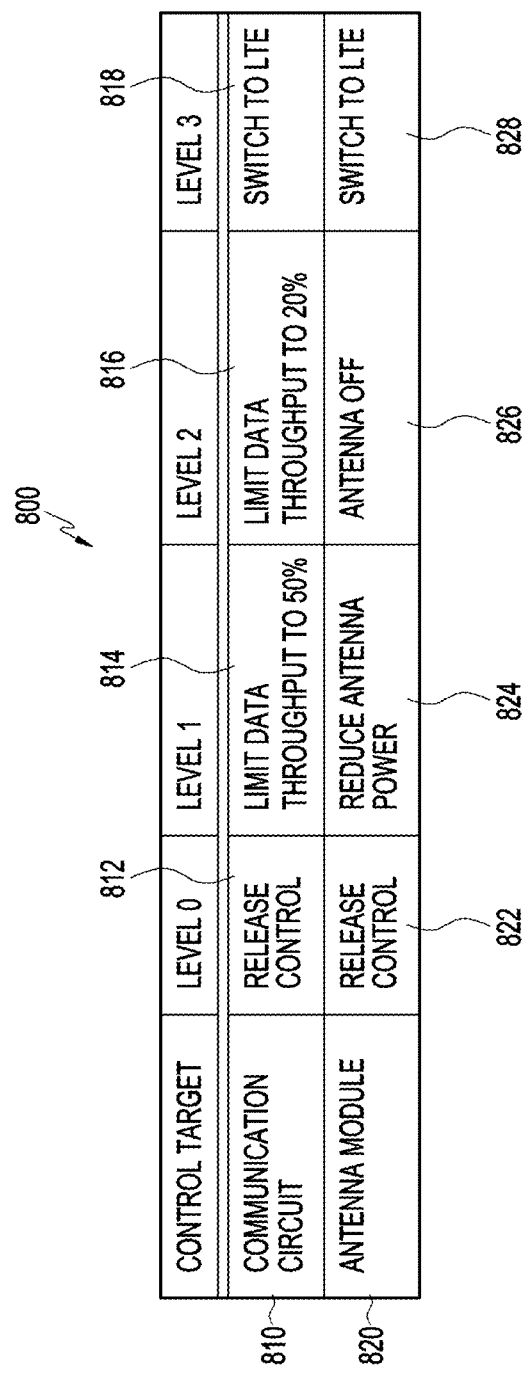
FIG. 8 illustrates a table of example control levels per control target according to an embodiment.

FIG. 8 illustrates a table 800 of example control levels per control target according to an embodiment.

According to an embodiment, the electronic device may determine a control level for at least one of a communication circuit or antenna, which is a target for control, based on the table of FIG. 8.

Referring to FIG. 8, the control target may include a communication circuit 810 and an antenna module 820. According to an embodiment, the electronic device may determine any one control level among a plurality of control levels for the communication circuit 810 and the antenna module 820. Although FIG. 8 illustrates an example in which the plurality of control levels is divided largely into four, this is merely an example and is not limited to the four levels, but may rather be divided into at least one level, and the number of control levels is not limited thereto.

According to an embodiment, the electronic device may determine the control level for heat generation control, corresponding to the surface heat generation temperature, according to a predefined reference and based on the table. For example, if the surface heat generation temperature exceeds a predetermined temperature, e.g., when the surface heat generation temperature falls within a first range (e.g., not less than a first temperature and less than a second temperature), the electronic device may set the control level for the communication circuit 810 and antenna module 820 to level 1. If the surface heat generation temperature falls within a second range (e.g., not less than the second temperature and less than a third temperature), the electronic device may set the control level to level 2.

If the surface heat generation temperature falls within a third range (e.g., not less than the third temperature and less than a fourth temperature), the electronic device may set the control level to level 3. If the surface heat generation temperature falls within a fourth range (e.g., not less than the fourth temperature and less than a fifth temperature), the electronic device may set the control level to level 4. If the surface heat generation temperature departs off the fourth range, i.e., overheats, a sharp temperature drop is required and, thus, the electronic device may perform forced termination that limits all running applications and operations, rather than stepwise adjustment.

For example, at level 0 (812), the electronic device may release the heat generation control for the communication circuit 810. At level 1 (814), the electronic device may perform control to limit the data throughput rate for the communication circuit 810 to, e.g., 50% (e.g., limiting the speed to 500 Mbps). As such, as data transmission/reception speed reduces, the current consumption in the communication circuit 810 or antenna module 820 may decrease, and the temperature of the surface of the electronic device, where the communication circuit 810 or antenna module 820 is positioned, may be lowered.

At level 2 (816), the electronic device may limit the data throughput rate to, e.g., about 20% (e.g., limiting the speed to 200 Mbps), and thus, current consumption may be further reduced, and so are heat generation factors. Thus, a heat generation circumstance may be controlled by controlling the data throughput rate. At level 3 (818), the electronic device may limit the operation of the communication circuit 810, controlling to switch to LTE communication. For example, at level 3, the electronic device may turn off the communication circuit 810 for 5G communication, allowing another communication circuit for LTE communication, which is used as an assistant means for 5G communication, to serve as the main communication circuit.

Here, data throughput rate may mean controlling throttling. According to an embodiment, the electronic device may control the data throughput rate (e.g., Tput) via ACK/NACK packet control. For example, after receiving a packet, the electronic device may stop transmission of a hybrid automatic repeat request (HARQ) ACK/NACK to the base station, thereby varying the duty cycle of physical uplink control channel (PUCCH) period of the electronic device. As such, the amount of data received may be varied by changing the duty cycle. According to an embodiment, the electronic device may set the throughput rates of data download and upload, such as data reception or data transmission, to have different values at the same control level. For example, for level 1, the electronic device may set a download throughput rate of about 50% and an upload throughput rate of about 30%. As such, the electronic device may set various data throughput rates (or data throughput) depending on control levels.

The control operation of the communication circuit 810 per control level has been described above, and the control operation for the antenna module 820 per control level is described below.

For example, at level 0 (822), the electronic device may release (812) the heat generation control for the antenna module 820. At level 1 (824), the electronic device may perform control to reduce the power of the antenna module 820. For example, the power of the antenna module 820 may be adjusted while varying the number of antenna elements per sub array to 4, 2, 1, and 0. If the number of antenna elements in one antenna module reduces due to a temperature rise, e.g., if two or one element is set per sub array, the current consumption of the antenna module 820 may reduce, and so may power. As such, at level 1 (824), a first beam may be formed using only at least part of one antenna module, and a beam corresponding to 5G communication in one antenna module may be found using the first beam.

At level 2 (826), the electronic device may limit the operation of at least part of the antenna module 820 and, to that end, the electronic device may perform control to turn off at least one of the antenna modules in the antenna module 820. For example, the control to turn off at least one antenna module is to set to reduce the number of elements per sub array to 0, and the corresponding antenna module is turned off so that a beam corresponding to 5G communication may be discovered using other antenna module. For example, a second beam may be formed using any one of a plurality of antenna modules, and the second beam may be used to find the beam corresponding to 5G communication.

At level 3 (828), the electronic device may limit the operation of the antenna module 820. For example, the electronic device may turn off the entire antenna module 820 so that none of the antenna modules in the antenna module 820 perform data transmission/reception. As such, controlling to switch to LTE communication may mean turning off the entire antenna module 820.

As set forth above, a current consumption rise in the communication circuit 810 or antenna module 820 upon 5G communication may be stepwise reduced by controlling the data throughput rate or performing power control or off operation on the antenna module. Thus, the temperature of the surface of the electronic device, where the communication circuit 810 or antenna module 820, which is a heat-generating source of 5G communication, is positioned, may be locally reduced, thereby decreasing the overall surface heat.

Figure 9:
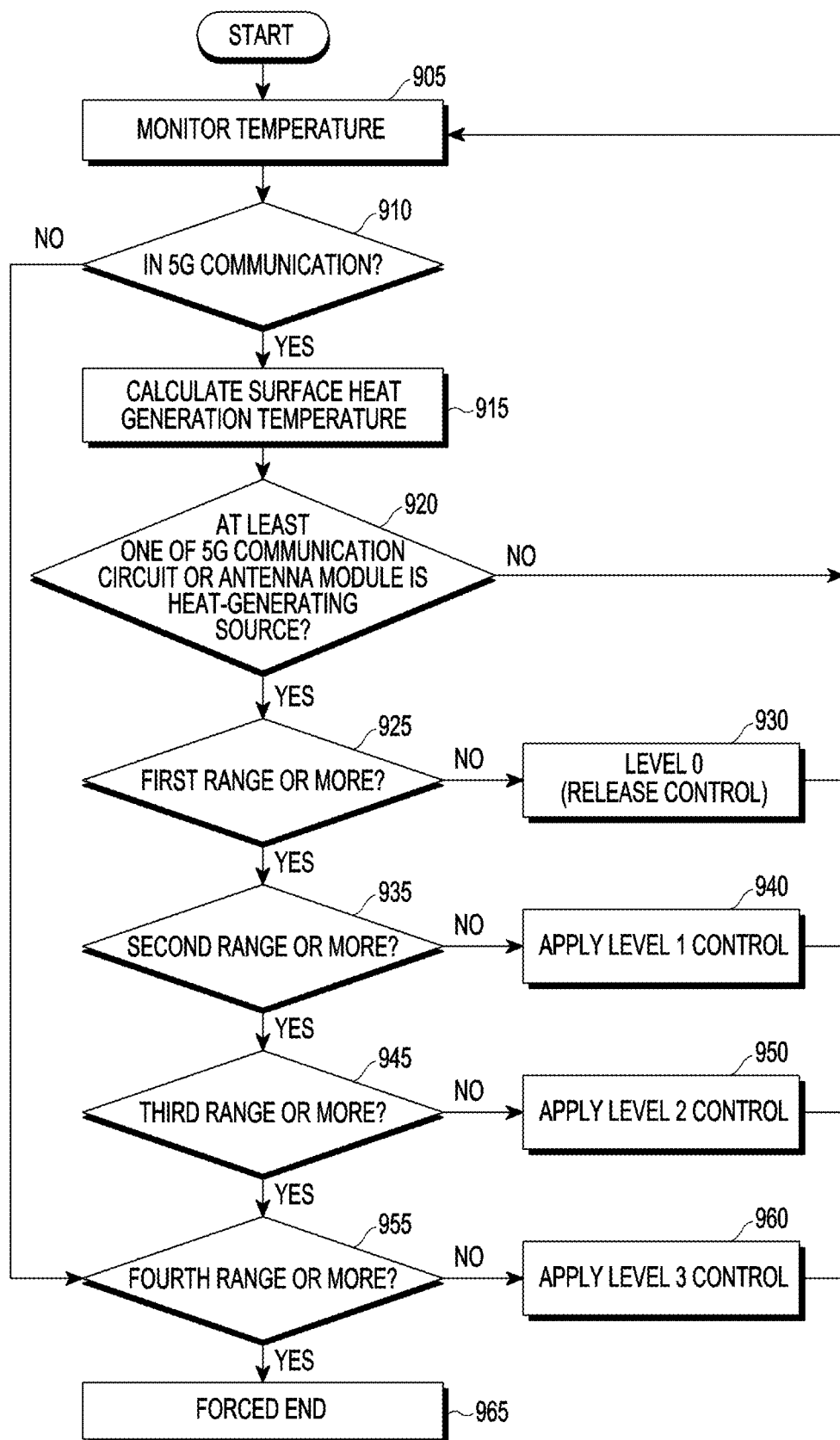
FIG. 9 illustrates a flowchart of operations for determining a control level depending on the surface heat generation temperature of an electronic device according to an embodiment.

FIG. 9 illustrates a flowchart 900 of operations for determining a control level depending on the surface heat generation temperature of an electronic device according to an embodiment.

Referring to FIG. 9, the operation method may include operations 905 to 965. Each step/operation of the operation method may be performed by at least one of an electronic device (e.g., the electronic device 101 or 301 of FIG. 1, 2, or 3) or at least one processor (e.g., the processor 120 or 320 of FIG. 1, 2, or 3) of the electronic device. According to an embodiment, at least one of operations 905 to 965 may be omitted or changed in order or other operations may be added.

Referring to FIG. 9, in operation 905, the electronic device may monitor its temperature using at least one temperature sensor (e.g., the temperature sensor 376 of FIG. 3). For example, the electronic device may measure the temperature of at least one of the communication circuit (e.g., the first communication circuit 391 of FIG. 3) or antenna module (e.g., the antenna module 397 of FIG. 3), which is a heat-generating source upon 5G communication, using at least one temperature sensor. Further, the electronic device may receive the temperature measured periodically or under each predetermined condition, from temperature sensors disposed adjacent to the battery or adjacent to the area where one or more elements (e.g., the plurality of elements of FIG. 3).

According to an embodiment, the electronic device may measure temperature in a predetermined period or when a specific condition is met. For example, the electronic device may monitor its temperature in each predetermined period (e.g., 10 seconds). According to an embodiment, although measuring the temperature in each predetermined period or when a specific condition is met, the electronic device may control to periodically measure the temperature of each of the 5G communication-related components (e.g., the antenna module 397 and first communication circuit 391 of FIG. 3) while connection for 5G communication is being attempted or while 5G communication is in connection.

In operation 910, the electronic device may determine whether 5G communication is running. For example, upon 5G communication, the electronic device consumes more power due to an increase in data throughput and use of a high frequency band which ends up causing more heat and hence overheating of the antenna module in use or the surroundings of the antenna module. Thus, the electronic device may perform heat generation control while 5G communication is being performed, thereby lowering the heat upon 5G communication. To that end, the electronic device may monitor the temperature of at least one of the antenna module (e.g., the antenna module 397 of FIG. 3) or 5G communication circuit (e.g., the first communication circuit 391 of FIG. 3) only while 5G communication is in connection. In addition, the electronic device may measure the temperature of various components (e.g., the processor 320, charger IC 331, camera 380, power management module 388, or battery 389 of FIG. 3).

If 5G communication is running, the electronic device may calculate the surface heat generation temperature in operation 915. According to an embodiment, the electronic device may calculate the surface heat generation temperature using a linear regression analysis scheme based on the monitored temperature. Here, the linear regression analysis scheme may be a completely trained learning model.

Then, in operation 920, the electronic device may identify whether at least one of the 5G communication circuit or antenna module is a heat-generating source. For example, the heat generation position of the electronic device may be identified based on the determined surface heat generation temperature.

In operation 925, the electronic device may identify whether the surface heat generation temperature is not less than the first range. Unless the surface heat generation temperature is not less than the first range, e.g., if being not more than the threshold temperature at which heat generation control is unnecessary, the electronic device may set level 0 among the plurality of levels for heat generation control in operation 930. In the state before performing heat generation control, the electronic device may maintain that state. In contrast, if the surface heat generation temperature is lowered while heat generation control is performed, the control for the heat generation control may be released.

In operation 935, the electronic device may identify whether the surface heat generation temperature is not less than the second range. Unless the surface heat generation temperature is not less than the second range, e.g., when the surface heat generation temperature is not less than the first range but is less than the second range, the electronic device may apply control of level 1 in operation 940. According to an embodiment, corresponding to the level-1 control, the electronic device may adjust the power of the antenna module (e.g., the antenna module 397 of FIG. 3) and may limit the data throughput rate via the first communication circuit (e.g., the first communication circuit 391 of FIG. 3) to, e.g., a first throughput rate. At this time, since the heat generation position may be identified corresponding to the surface heat generation temperature, at least some operations of at least one of the antenna module or the first communication circuit, corresponding to the identified position, may be limited.

In operation 945, the electronic device may identify whether the surface heat generation temperature is not less than the third range. Unless the surface heat generation temperature is not less than the third range, e.g., when the surface heat generation temperature is not less than the second range but is less than the third range, the electronic device may apply control of level 2 in operation 950. According to an embodiment, corresponding to the level-2 control, the electronic device may turn off at least part of the antenna module (e.g., the antenna module 397 of FIG. 3) and may limit the data throughput rate via the first communication circuit (e.g., the first communication circuit 391 of FIG. 3) to, e.g., a second throughput rate. The first throughput rate may be higher than the second throughput rate, and various settings may be made for the data throughput rate depending on control levels.

In operation 955, the electronic device may identify whether the surface heat generation temperature is not less than the fourth range. Unless the surface heat generation temperature is not less than the fourth range, e.g., when the surface heat generation temperature is not less than the third range but is less than the fourth range, the electronic device may apply control of level 3 in operation 960. According to an embodiment, corresponding to the level-3 control, the electronic device may limit all of the operations of the antenna module (e.g., the antenna module 397 of FIG. 3) and the first communication circuit (e.g., the first communication circuit 391 of FIG. 3) and control to perform communication in an LTE scheme via the second communication circuit (e.g., the second communication circuit 392 of FIG. 3).

If the surface heat generation temperature is not less than the fourth range, this indicates overheat generation due to 5G communication and, thus, the electronic device may forcedly terminate all of the operations of the running application and process in operation 965.

Figure 10:
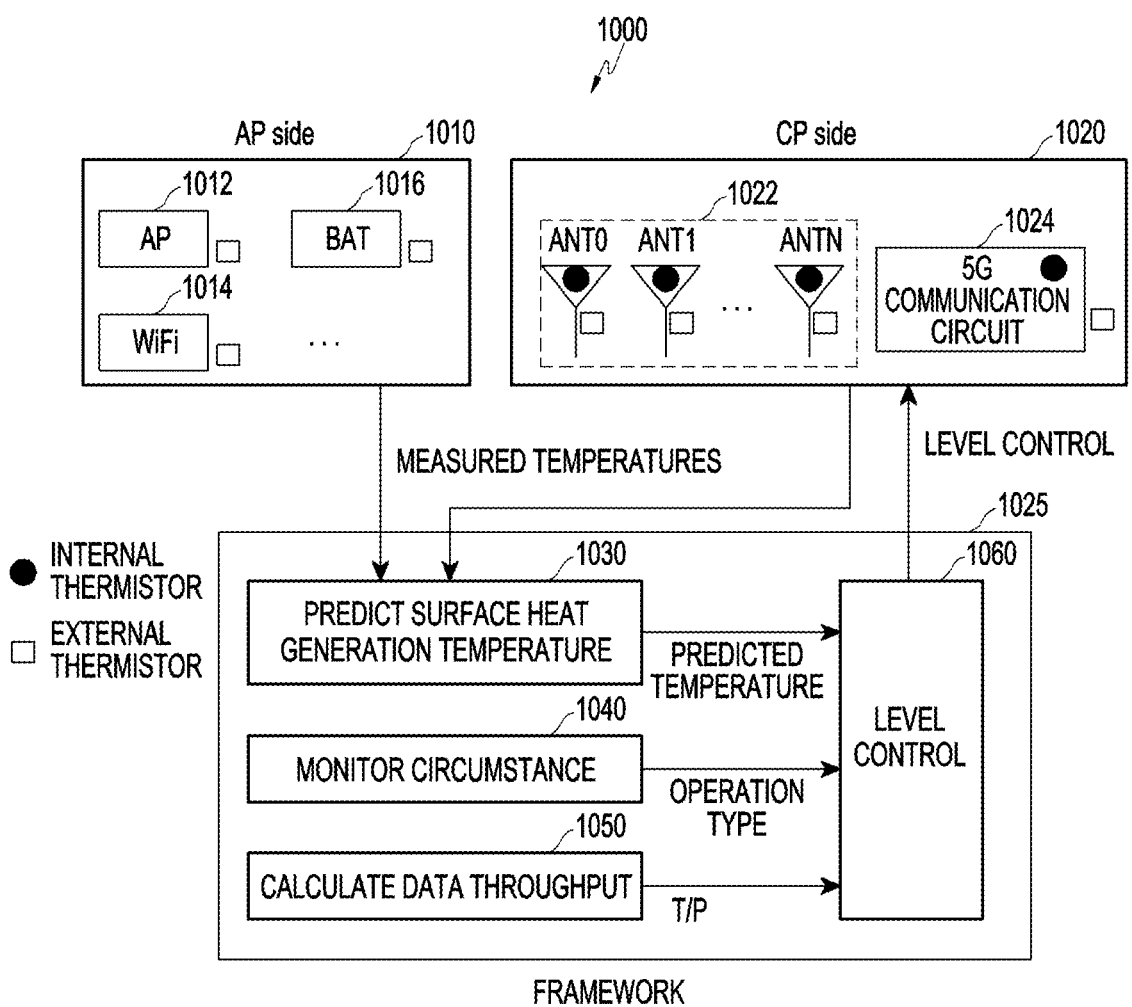
FIG. 10 illustrates a view of example operations on a framework end for heat generation control according to an embodiment.

FIG. 10 illustrates a view of example operations 1000 on a framework end for heat generation control according to an embodiment.

Referring to FIG. 10, according to an embodiment, not only the CP-side 1020 components, e.g., the antenna module 1022 and 5G communication circuit 1024, but also the AP-side 1010 components, e.g., the AP 1012, Wi-Fi module 1014, and battery, or such heat generation-related elements, are measured for their temperature, according to a designated period or condition, so as to control the heat generation circumstance during 5G communication. According to an embodiment, internal thermistor information for the inside of each antenna in the CP-side 1020 antenna module 1022 may be used to grasp variations in temperature due to actual use of the antenna module. External thermistor information for the outside of each antenna in the antenna module 1022 may be used primarily for figuring out influence of the heat generated inside the antenna module on the surface temperature, but may also be affected by the heat generated from other modules, such as other antenna modules or the 5G communication circuit 1024. According to an embodiment, the internal temperature and the external temperature both may be used to determine whether heat generation originates from the own operation of the antenna module which is the target for control.

Meanwhile, in terms of operations on the framework end 1025, measured temperatures may be used for predicting the surface heat generation temperature, and the predicted temperature may be used for level control 1060. Further, the operation type may also be used for level control 1060, based on the result of monitoring 1040 the operation context. According to an embodiment, although the operation type is exemplified as used for level control after predicting the surface heat generation temperature, the operation type may be used upon predicting the surface heat generation temperature. For example, various operation types, such as game playing, video calls, or battery charging, may be used to predict the surface heat generation temperature. In contrast, if the operation type is considered, with the surface heat generation temperature already predicted based on the measured temperature, the threshold temperature for determining the control level may be varied. Thus, if the operation type as well as the surface heat generation temperature is taken into consideration, the start point of the threshold temperature, when heat generation control commences, may be varied.

According to an embodiment, data throughput upon 5G communication may be calculated 1050, and the calculated data throughput may be used for level control 1060 as well. For example, the data throughput defined per control step may be identified, and the predicted surface heat generation temperature and the determined data throughput may be transferred to the processor (e.g., the processor 320 of FIG. 3) to be used for level control 1060.

Figure 11:
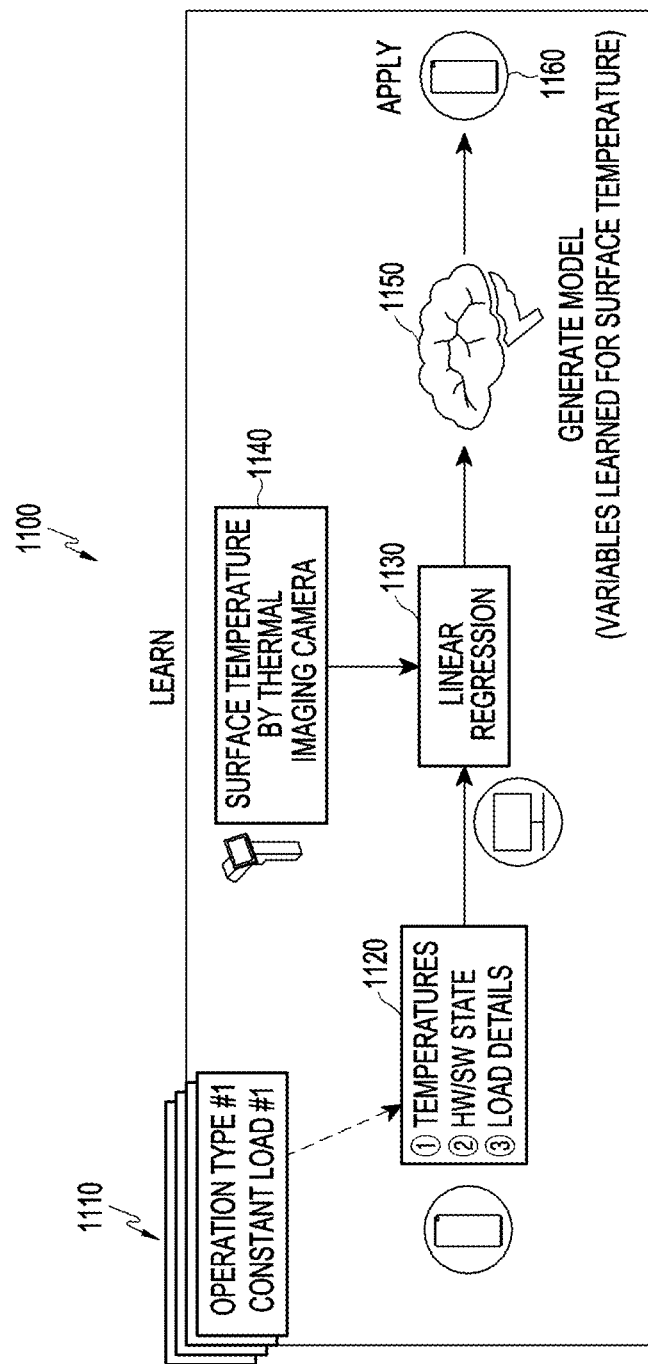
FIG. 11 illustrates a view of a linear regression analysis scheme according to an embodiment.

FIG. 11 illustrates a view 1100 of a linear regression analysis scheme according to an embodiment.

Referring to FIG. 11, linear regression analysis is a regression analysis scheme for modeling the linear correlation between one dependent variable y and one or more independent variables x as in Equation 1 below.

$$y_i = \beta_1 x_{i1} + \ldots + \beta_p x_{ip} + \varepsilon_i, i = 1, \ldots, n.$$ [Equation 1]

In Equation 1 above, x may be the input variable, y may be the output variable, $\beta_i$ may be the coefficient of each independent variable, and p may be the number of the independent variables.

To model the linear correlation between one dependent variable y and one or more independent variables x, a given data set is required, and a linear relation between p input variables $x_i$ and their dependent variables $y_i$ may be modeled.

According to an embodiment, the learning model (or learning program) for calculating the surface heat generation temperature as shown in FIG. 11 may also be termed a 'linear' regression analysis scheme because it may be expressed as in Equation 1.

As shown in FIG. 11, various data sets including a plurality of operation types may be given. For example, data that may increase temperature, e.g., use of camera, GPU load, and CPU load, corresponding to operation types, and data 1120 including load details, HW/SW state, and temperatures from the thermistors inside the electronic device may be input variables (or independent variables) $x_i$. In contrast, the output variable (or dependent variable) $y_i$ may be the actual surface temperature 1140 of the electronic device, measured by a thermal imaging camera.

By applying the input variables (or independent variables) $x_i$ indicating various data 1120 related to a temperature rise and the output variable (or dependent variable) $y_i$ indicating the actual surface temperature 1140 of the electronic device, measured by a thermal imaging camera, to linear regression, e.g., Equation 1, $\beta_i$ and $\varepsilon_i$ in Equation 1 may be obtained. By repeating the above process, learning may be performed, and variables, such as $\beta_i$ and $\varepsilon_i$, trained for the surface heat generation temperature (or surface temperature) may be obtained, and they may be used to create (1150) a learning model.

As such, according to an embodiment, if the model (or learning algorithm or program) created via learning is applied 1160 to the electronic device, the surface heat generation temperature may be calculated for the input variables (or independent variables) $x_i$ which are varied in real-time.

FIG. 12 illustrates a table 1200 of example data used for predicting the surface heat generation temperature according to an embodiment.

FIG. 12 shows example input variables (or independent variables) $x_i$ 1210, e.g., various elements that may be related to a temperature rise, such as the heat generation zone (or heat generation position) in the electronic device, power, internet, running application, e.g., memory usage, system CPU occupancy, or other system usage or battery information. FIG. 12 also shows the output variable (or dependent variable) $y_i$, which may include, e.g., ADC. The data used for predicting the surface heat generation temperature may also include the temperature of other heat-generating elements, e.g., the Wi-Fi module, AP, power amplifier (PA), or charger. The maximum surface temperature of the electronic device measured by a thermal imaging camera may also be used in creating the model for predicting the surface heat generation temperature.

As set forth above, the linear regression analysis scheme may be an algorithm trained to predict the surface heat generation temperature using all of information related to the performance level of the electronic device, such as whether it is charged, whether the camera is in use, whether 5G connected, or other operation types of the electronic device, temperatures measured for various components, e.g., the AP, power management module, battery, Wi-Fi module, or charger IC, as well as the temperature measured for the antenna module or the 5G communication circuit.

According to an embodiment, as input variables (or independent variables) xi of the learning model, such information as whether 5G network is connected, data transmission rate, or such information, as well as the temperature information for the 5G communication circuit and antenna module may be further used. If such information as whether 5G network connected and data transmission rate are also set as input variables, a learning model considering such may be created to predict the surface heat generation temperature. For example, an example operation type, e.g., data transmission rate during 5G communication, along with the temperature measured during 5G communication, may be used to predict the surface heat generation temperature. Thus, the electronic device may compare the threshold data transmission rate defined per control step with the actual data transmission rate and perform heat generation control not to exceed the defined threshold data transmission rate.

Figure 13:
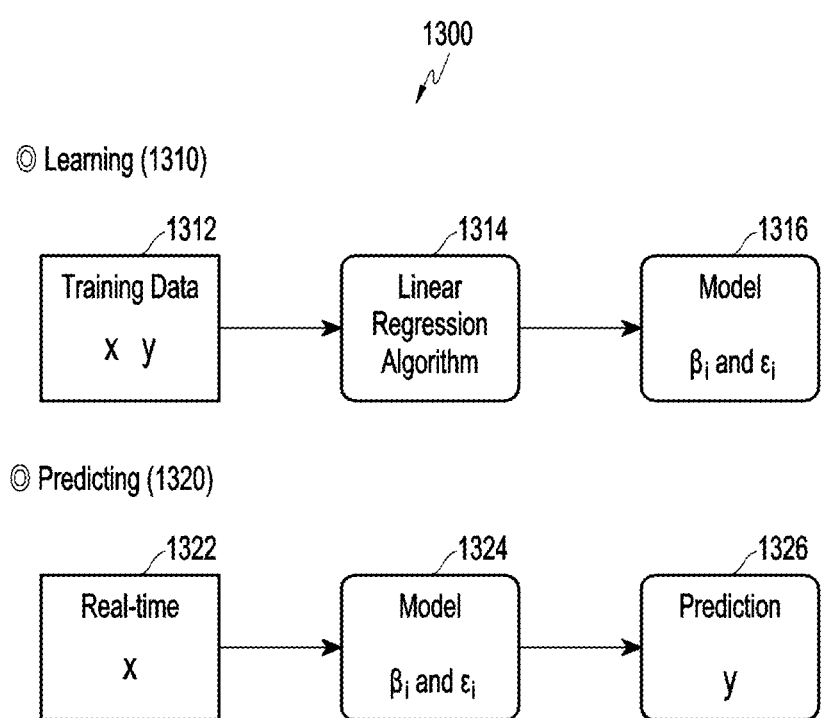
FIG. 13 illustrates a view of a learning operation and a prediction operation according to an embodiment.

FIG. 13 illustrates a view 1300 of a learning operation and a prediction operation according to an embodiment.

Referring to FIG. 13, a regression analysis process for predicting the surface heat generation temperature may be largely divided into a learning step (or training step) and a prediction step.

First, in the case where learning is underway for creating a model, if training data 1312, which may define the heat generation circumstance, such as game playing, video calls, or overload environment, as the input variable (or independent variable) xi and the output variable (or dependent variable) yi, is applied to the linear regression algorithm 1314, variables, such as βi and εi, learned for the surface heat generation temperature and the learning model 1316 may be obtained. As described above, data for obtaining the coefficients of regression analysis and error variables (e.g., βi and εi) may be extracted from at least one heat generation-related element included in the operation types of the electronic device. In the initial learning step 1310, the scenario indicating a combination of at least one heat generation-related element included in the operation types of the electronic device varies. Thus, learning may be performed based on, e.g., the method of least squares to actually measure various setting information for various input variables, e.g., information for each thermistor and CPU load, and the surface heat generation temperature at that time and then obtain the coefficients and error variables (e.g., βi and εi) based on the actually measured surface heat generation temperature and the setting information.

Meanwhile, in the case where prediction is in progress 1320, i.e., when learning was done, and a learning model has been created, operation types may be identified in real-time based on the coefficients and error variables (e.g., βi and εi) learned in the learning step, and the identified operation types may be set 1322 as input variables (or independent variables) xi and, when applied to the learning model 1324, the predicted surface heat generation temperature, i.e., output variable (or dependent variable) yi may be obtained. By using the learning model in the prediction step, the learning model may steadily be updated. As such, use of the learning model allows for real-time prediction and calculation of the surface heat generation temperature based on various operation types which vary in real-time, actively responding to the heat generation circumstance that varies upon 5G communication and hence lowering the temperature.

Figure 14:
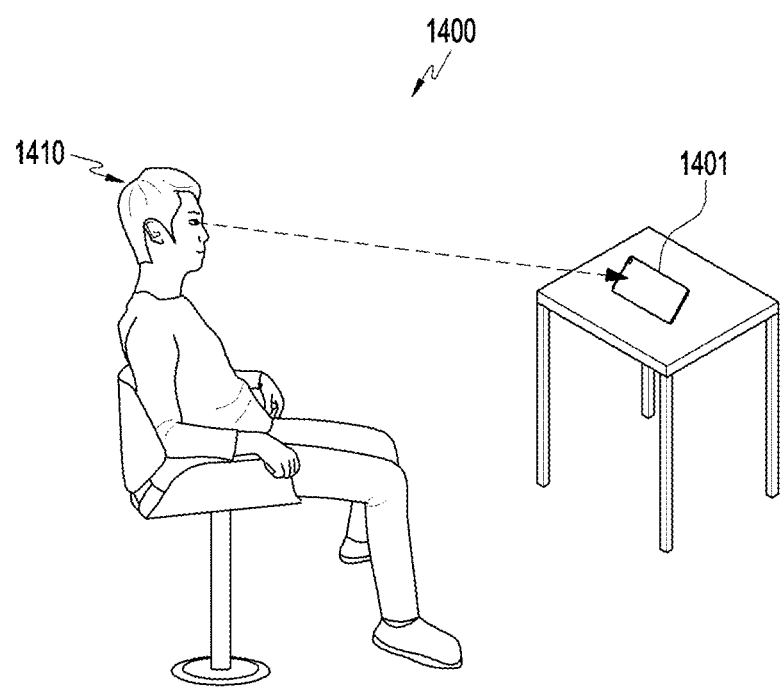
FIG. 14 illustrates a view of an example of heat generation control in a mounted state according to an embodiment.

FIG. 14 illustrates a view 1400 of an example of heat generation control in a mounted state according to an embodiment.

Referring to FIG. 14, a user 1410 may use an application, e.g., a video play application, with an electronic device 1401 placed on the desk. As such, if the electronic device 1401 is propped on a mount, the surface heat generation in the electronic device 1401 may be influenced by the type of at least one application that is running. Here, a variation in the slope and rotation of the electronic device 1401 may be detected and, if no such variation is detected, the electronic device 1401 may be determined as having been mounted.

For example, heat generation control may be performed considering the type of at least one application, e.g., a video call, game, video recording, or navigation application. In this case, the user may simultaneously run two or more applications. For example, if the user attempts to make a video call while using navigation, a temperature rise may occur. To reduce the surface heat generation temperature, the electronic device 1401 may perform the control operations stepwise, and the electronic device 1401 may perform per-step control operations considering the type of at least one application.

Figure 15:
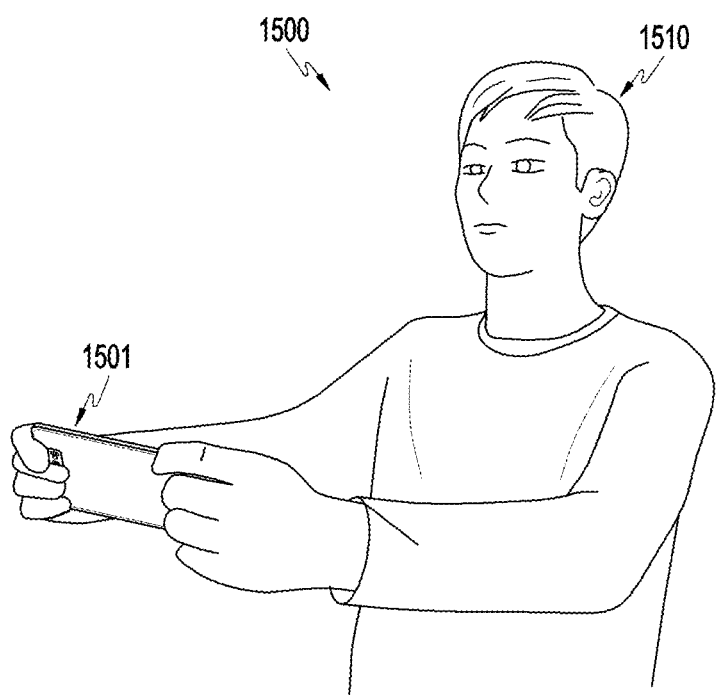
FIG. 15 illustrates a view of an example of heat generation control in a gripped state according to an embodiment.

FIG. 15 illustrates a view 1500 of an example of heat generation control in a gripped state according to an embodiment.

Referring to FIG. 15, a user 1510 may use an electronic device 1501, with it in his hands (i.e. 'gripped state'). The electronic device 1501 may detect the user's grip on the electronic device 1501 using a grip sensor disposed on at least one of a side and back surface of the electronic device 1501. For example, the electronic device 1501 may detect the gripped state only while 5G communication is performed and, in the gripped state, the electronic device 1501 may perform per-step control operations using a higher threshold temperature than the threshold temperature of the mounted state. If the user uses the electronic device 1501 with it in his hands, the surface heat generation temperature may rise more than in the mounted state and, given this, the threshold temperature may be set to be higher. For example, the threshold temperature in the gripped state may be higher than the threshold temperature in the mounted state. As such, if the gripped state is detected, the threshold temperature at which the per-step control operations start may be set to be higher, thereby allowing the user to more readily use the electronic device.

The threshold temperature may also be varied depending on the type of the application running in the gripped state. For example, if the user runs a high-spec game application with the electronic device 1501 in his hands, the threshold temperature for heat generation control may rise up. In contrast, if the user executes a browser application with the electronic device 1501 in his hands, the threshold temperature for heat generation control may be set to be lower than when running a high-spec game application.

As set forth above, according to an embodiment, the threshold temperature for identifying a corresponding control step among the plurality of control steps may be set to differ depending on at least one heat generation-related element included in the operation type of the electronic device, such as, e.g., whether gripped or not or the type of running application.

Figure 16:
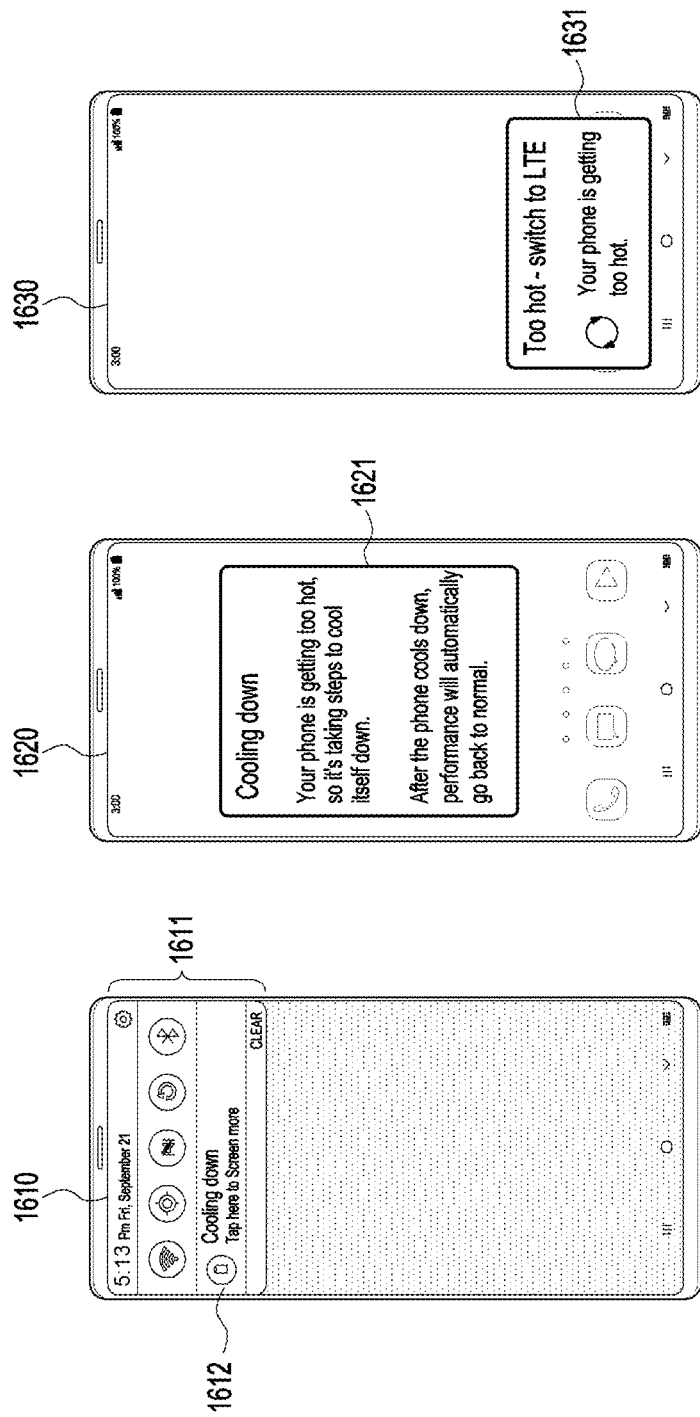
FIG. 16 illustrates a view of an example user interface displayed on an electronic device according to an embodiment.

FIG. 16 illustrates a view 1600 of an example user interface displayed on an electronic device according to an embodiment.

In the description of FIG. 16, operations described to be performed by an electronic device may be appreciated as controlled by a processor of the electronic device (e.g., the processor 120 of the electronic device 101 of FIG. 1 or the processor 320 of the electronic device 101 of FIG. 3).

Referring to FIG. 16, according to an embodiment, the electronic device may output a first screen 1610, a second screen 1620, or a third screen 1630, which is related to the heat generation circumstance, on a display (e.g., the display device 160 of the electronic device 101 of FIG. 1).

According to an embodiment, if the surface heat generation temperature falls within a designated range, the electronic device may output a notification on the display. For example, there may be provided a plurality of designated ranges, and the content of the notification to be output may be varied corresponding to the range where the surface heat generation temperature belongs among the plurality of ranges. For example, the heat generation control operation of the electronic device may be varied corresponding to the range where the surface heat generation temperature belongs, and a notification as to what control operation is performed based on the heat generation control operation may be output. For example, the notification may be varied depending on the control step, e.g., a notification that data speed may be slowed down while informing the user that he can continuously use the electronic device or a notification that 5G communication switches to LTE communication.

For example, as in the first screen 1610, the electronic device may output an indicator or notification message indicating the heat generation control context on the status display panel 1611. When a touch input is applied to a portion of the notification message 1612 in the first screen 1610, the electronic device may output a second screen 1620 related to the detailed notification.

According to an embodiment, the electronic device may output a popup window 1621 with a notification indicating it is lowering the overheated temperature during 5G communication on the second screen 1620.

According to an embodiment, if the surface heat generation temperature falls within a designated range while an application is running, the electronic device may overlay a popup window 1631 to indicate that 5G communication switches to LTE communication on the application running screen, as in the third screen 1630. The popup window 1631, after staying on for a designated time (e.g., two seconds), may disappear.

According to an embodiment, if the surface heat generation temperature is lowered by the heat generation control operation, e.g., when it departs off the designated range so control is not needed any longer, the electronic device may switch LTE communication back to 5G communication and display a popup window to indicate the switch on the application running screen. As set forth above, the electronic device may output the heat generation control context on the screen, putting the user on notice for the heat generation circumstance and hence minimizing the user's inconvenience.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C" and "at least one of A, B, or C" may include all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with" or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part" or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, there is provided a storage medium storing instructions, the instructions configured to, when executed by at least one processor, enable the at least one processor to perform at least one operation, the at least one operation comprising, upon communication in a first communication scheme using a first communication circuit via at least one antenna module, detecting a temperature associated with at least one of the antenna module or the first communication circuit from at least one temperature sensor, identifying a corresponding control step among a plurality of control steps based on an operation type of the electronic device and the at least one temperature detected, and limiting at least some operations on at least one of the antenna module or the first communication circuit, corresponding to the identified control step.

As is apparent from the foregoing description, according to various embodiments, it is possible to efficiently control the heat generation in the electronic device during 5G communication.

According to various embodiments, heat generation control may be differently set depending on the surface heat generation circumstance, allowing for more flexible operation restriction as compared with controlling only system resources of the application processor.

According to various embodiments, heat generation control may be differently set considering the circumstance of application running on the electronic device, as well as the temperature detected from the temperature sensor disposed around the 5G communication circuit or antenna, thereby enabling the application to run in a stable manner.

According to various embodiments, the operation of the antenna or 5G communication circuit may directly be controlled depending on the surface heat generation circumstance, lowering surface heat generation.

The embodiments herein are provided merely for better understanding of the disclosure, and the disclosure should not be limited thereto or thereby. It should be appreciated by one of ordinary skill in the art that various changes in form or detail may be made to the embodiments without departing from the scope of the disclosure defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a plurality of antenna modules;
a first communication circuit communicating in a first communication scheme via at least one antenna module among the plurality of antenna modules;
a second communication circuit communicating in a second communication scheme;
at least one temperature sensor;
at least one processor operatively connected with the first communication circuit, the second communication circuit, and the at least one temperature sensor; and
a memory storing instructions that when executed are configured to enable the at least one processor to:
identify a temperature associated with the at least one antenna module or the first communication circuit while communicating via the first communication circuit;
if the identified temperature associated with the at least one antenna module or the first communication circuit is greater than or equal to a first threshold temperature and less than a second threshold temperature, limit an operation on at least one of the at least one antenna module or the first communication circuit corresponding to the identified temperature; and
if the identified temperature is greater than or equal to the second threshold temperature, perform communication via the second communication circuit and turn off at least part of the first communication circuit.

2. The electronic device of claim 1, wherein the instructions are configured to cause the at least one processor to limit the operation of the at least one antenna module by turning off at least part of the at least one antenna module corresponding to the identified temperature.

3. The electronic device of claim 1, wherein the instructions are configured to cause the at least one processor to limit the operation of the at least one antenna module by reducing a number of antenna elements of the at least one antenna module corresponding to the identified temperature.

4. The electronic device of claim 1, wherein the instructions are configured to cause the at least one processor to limit the operation of the at least one antenna module by adjusting power of the at least one antenna module corresponding to the identified temperature.

5. The electronic device of claim 1, wherein the instructions are configured to cause the at least one processor to limit the operation of the first communication circuit by reducing a data throughput via the first communication circuit corresponding to the identified temperature.

6. The electronic device of claim 1, wherein the instructions are configured to cause the at least one processor to identify an operation type of the electronic device,
the operation type of the electronic device includes at least one of a type of at least one application in execution, whether the electronic device is gripped or whether the electronic device is charging.

7. The electronic device of claim 6, the instructions are configured to cause the at least one processor to set at least one of the first threshold temperature or the second threshold temperature based on the operation type of the electronic device.

8. The electronic device of claim 6, wherein the instructions are configured to cause the at least one processor to:
identify a surface heat generation temperature of the electronic device based on the operation type of the electronic device and the identified temperature; and limit at least some operations on the at least one antenna module or the first communication circuit corresponding to the identified surface heat generation temperature.

9. The electronic device of claim 8, wherein the instructions are configured to cause the at least one processor to:
identify a heat generation position of the electronic device based on the identified surface heat generation temperature; and
limit the at least some operations on the at least one antenna module or the first communication circuit corresponding to the identified heat generation position.

10. The electronic device of claim 1, wherein the at least one temperature sensor includes a first temperature sensor disposed in at least one of an inside and an outside of the at least one antenna module and a second temperature sensor disposed in at least one of an inside and outside of the first communication circuit.

11. The electronic device of claim 1, wherein the first communication scheme is a 5G communication protocol-based communication scheme, and the second communication scheme is a long-term evolution (LTE) communication protocol-based communication scheme.

12. A method for controlling heat generation in an electronic device, the method comprising:
upon communication in a first communication scheme using a first communication circuit via at least one antenna module among a plurality of antenna modules, identifying a temperature associated with the at least one antenna module or the first communication circuit from at least one temperature sensor;
if the identified temperature associated with the at least one antenna module or the first communication circuit is greater than or equal to a first threshold temperature and less than a second threshold temperature, limiting an operation on at least one of the at least one antenna module or the first communication circuit corresponding to the identified temperature; and
if response to the identified temperature is greater than or equal to the second threshold temperature, performing communication in a second communication scheme via a second communication circuit and turning off at least part of the first communication circuit.

13. The method of claim 12, wherein limiting the operation on the at least one antenna module or the first communication circuit includes:
turning off at least part of the at least one antenna module corresponding to the identified temperature.

14. The method of claim 12, wherein limiting the operation on the at least one antenna module or the first communication circuit includes:
reducing a number of antenna elements of the at least one antenna module corresponding to the identified temperature.

15. The method of claim 12, wherein limiting the operation on the at least one antenna module or the first communication circuit includes:
adjusting power of the at least one antenna module corresponding to the identified temperature.

16. The method of claim 12, wherein limiting the operation on the at least one antenna module or the first communication circuit includes:
reducing a data throughput via the first communication circuit corresponding to the identified temperature.

17. The method of claim 12, further comprising:
identifying an operation type of the electronic device, wherein the operation type of the electronic device includes at least one of a type of at least one application in execution, whether the electronic device is gripped or whether the electronic device is charging; and
setting at least one of the first threshold temperature or the second threshold temperature based on the operation type of the electronic device.

18. The method of claim 17, further comprising:
identifying a surface heat generation temperature of the electronic device based on the operation type of the electronic device and the identified temperature;
identifying a heat generation position of the electronic device based on the identified surface heat generation temperature; and
limiting the operation on at least one of the at least one antenna module or the first communication circuit corresponding to the identified heat generation position.

19. A non-transitory computer readable medium including a plurality of instructions that, when executed by at least one processor of an electronic device, enable the at least one processor to:
perform at least one operation, the at least one operation comprising:
upon communication in a first communication scheme using a first communication circuit via at least one antenna module, identifying a temperature associated with at least one of the at least one antenna module or the first communication circuit from at least one temperature sensor;
if the identified temperature associated with the at least one antenna module or the first communication circuit is greater than or equal to a first threshold temperature and less than a second threshold temperature, limiting an operation on at least one of the at least one antenna module or the first communication circuit corresponding to the identified temperature; and
if response to the identified temperature is greater than or equal to the second threshold temperature, performing communication in a second communication scheme via a second communication circuit and turning off at least part of the first communication circuit.

* * * * *